(12) United States Patent
Abe et al.

(10) Patent No.: US 8,238,440 B2
(45) Date of Patent: Aug. 7, 2012

(54) SEMICONDUCTOR INTEGRATED CIRCUIT

(75) Inventors: Hiroshige Abe, Tokyo (JP); Isamu Mochizuki, Tokyo (JP); Mika Mizutani, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 262 days.

(21) Appl. No.: 12/783,320

(22) Filed: May 19, 2010

(65) Prior Publication Data

US 2010/0303157 A1 Dec. 2, 2010

(30) Foreign Application Priority Data

May 29, 2009 (JP) ................................. 2009-130939

(51) Int. Cl.
*H04N 11/04* (2006.01)

(52) U.S. Cl. .......... 375/240.25; 375/240.26; 375/240.28

(58) Field of Classification Search ............. 375/240.25, 375/240.28, 240.26
See application file for complete search history.

(56) References Cited

U.S. PATENT DOCUMENTS

| 5,818,539 A * | 10/1998 | Naimpally et al. ........... 348/512 |
| 2007/0220584 A1 * | 9/2007 | Lee et al. ...................... 725/135 |
| 2010/0266050 A1 * | 10/2010 | Keidar et al. ............ 375/240.25 |

FOREIGN PATENT DOCUMENTS

JP 2007-201983 A 8/2007

* cited by examiner

*Primary Examiner* — Christopher S Kelley
*Assistant Examiner* — Jonathan Torchman
(74) *Attorney, Agent, or Firm* — Miles & Stockbridge P.C.

(57) ABSTRACT

The present invention is directed to lessen burden at the time of solving a conflict of overlapping processes in processes for a plurality of interruption factors. On completion of data transfer to an external memory, a data transfer completion interruption of high priority is generated. In the case where data transfer of predetermined number of packets is not completed in reception interruption, a timer interruption of low priority is generated. Before processing data in an external memory responding to the interruption, the number of transfer packets is obtained from a counter. After restart of reception, the counter stores the number of transfer restart packets. After obtaining the number of transfer packets from a counter responding to the occurrence of the timer interruption, a data transfer completion interruption is generated. According to the obtained number of transfer packets, execution of either a process responding to occurrence of the timer interruption or a process responding to occurrence of the data transfer completion interruption is omitted.

18 Claims, 21 Drawing Sheets

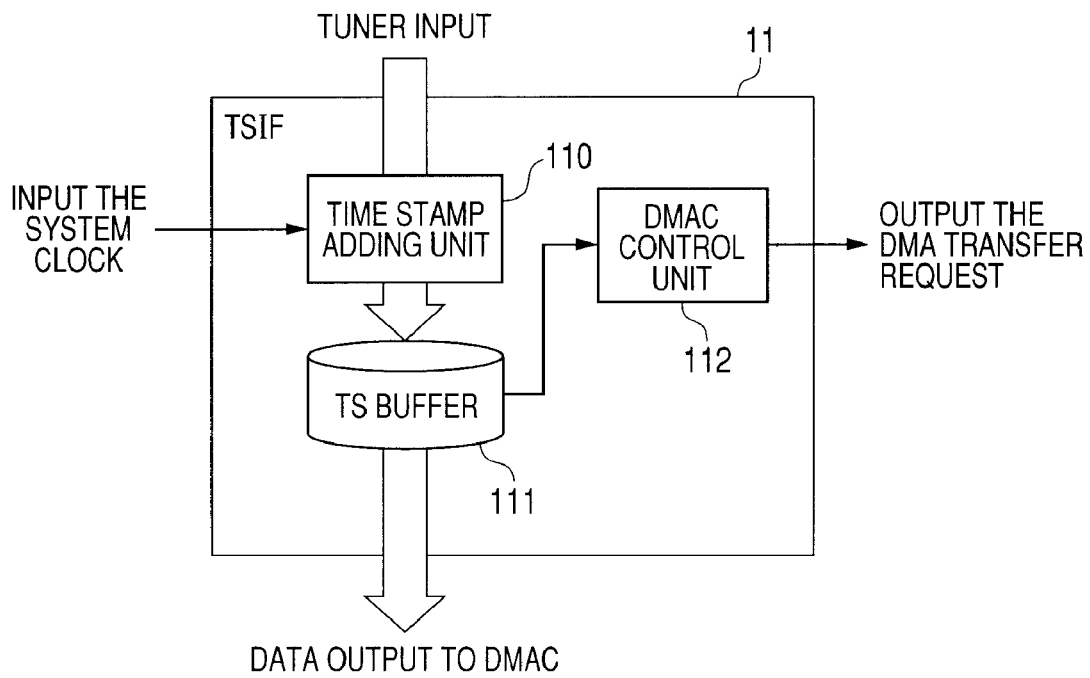
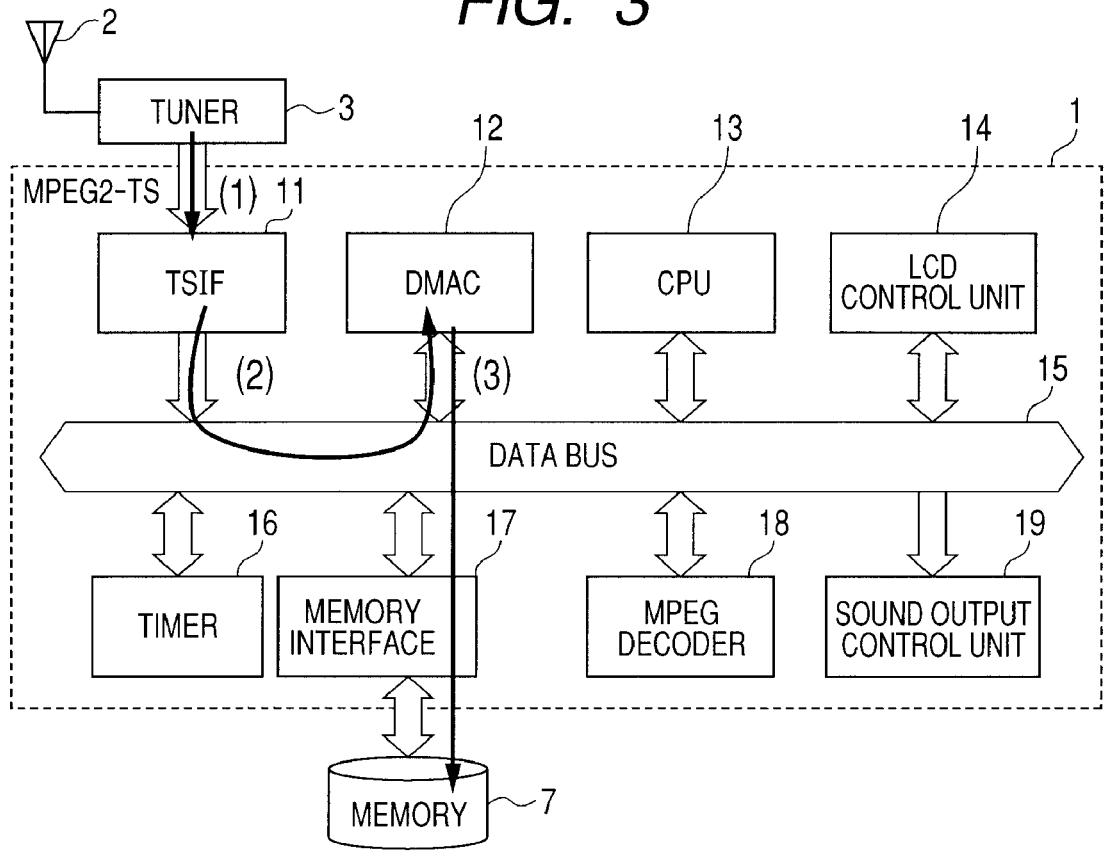

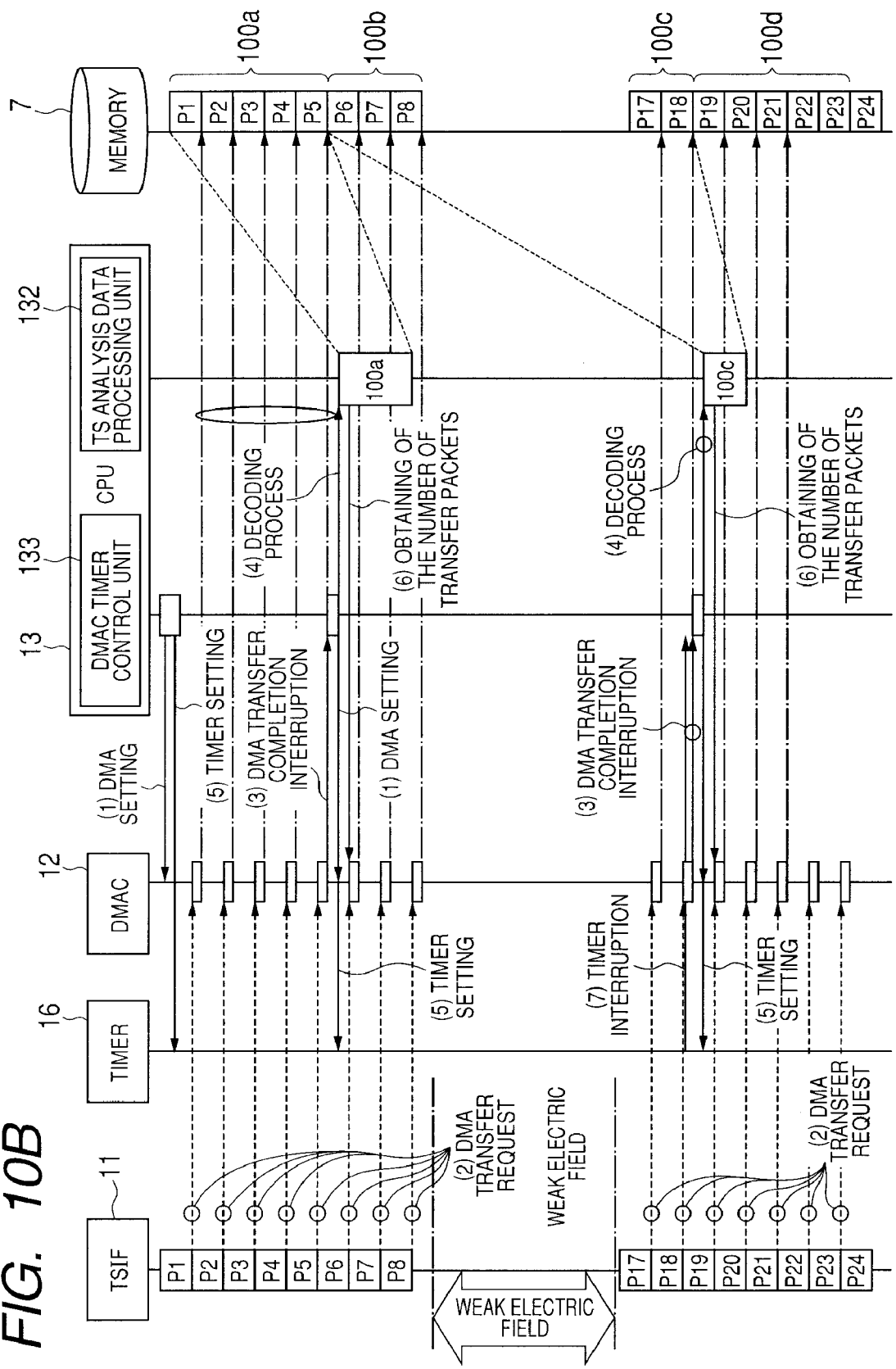

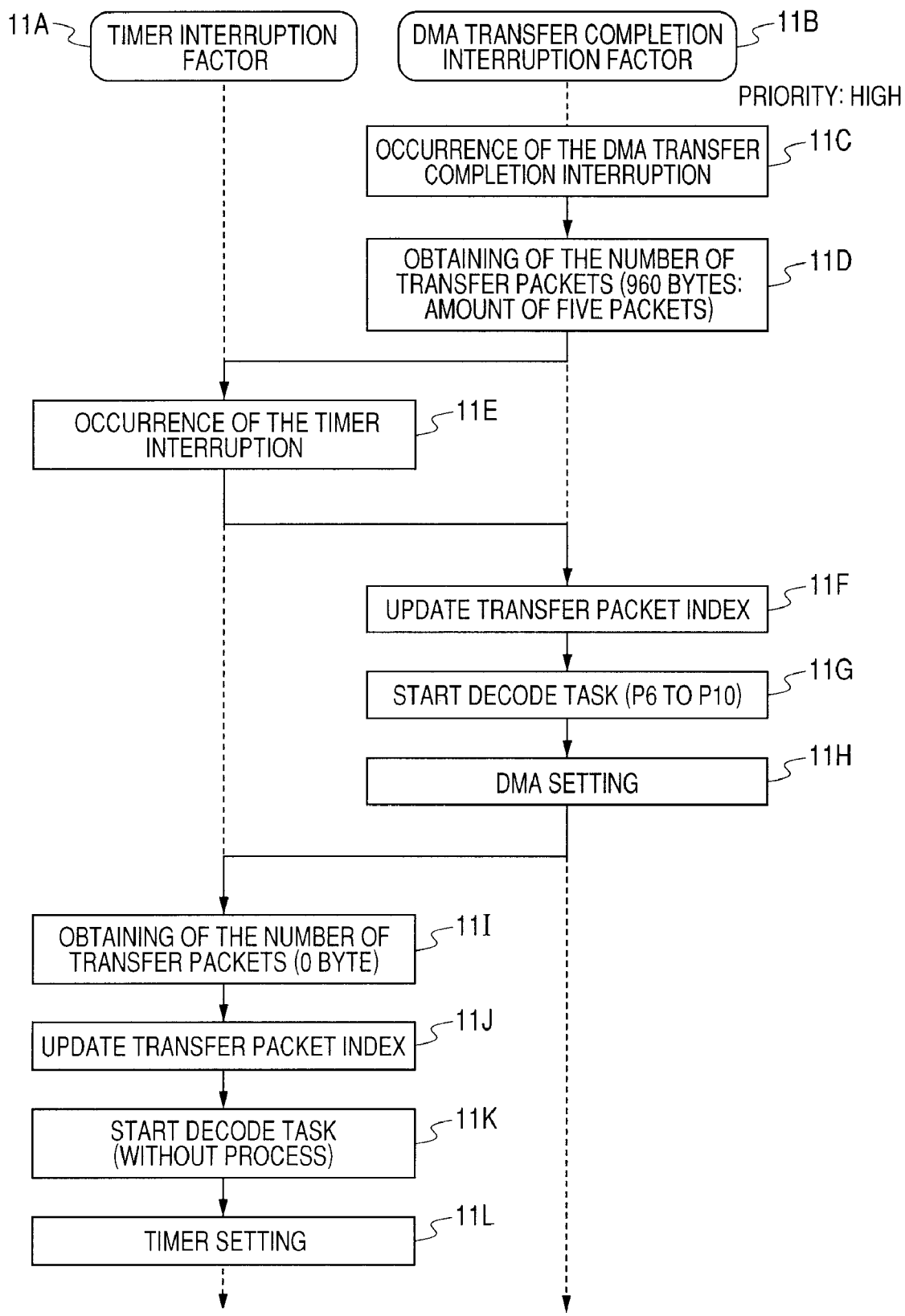

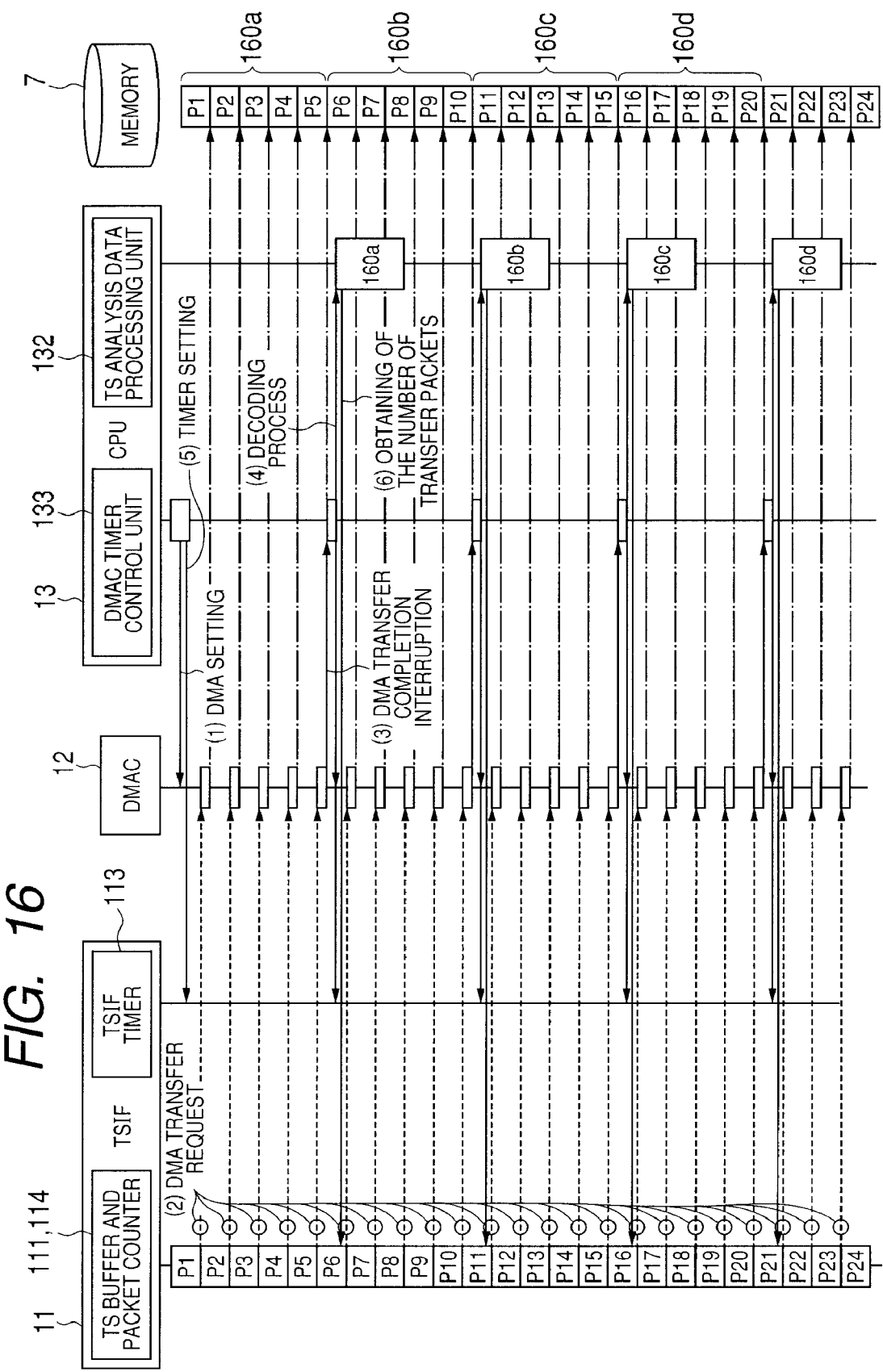

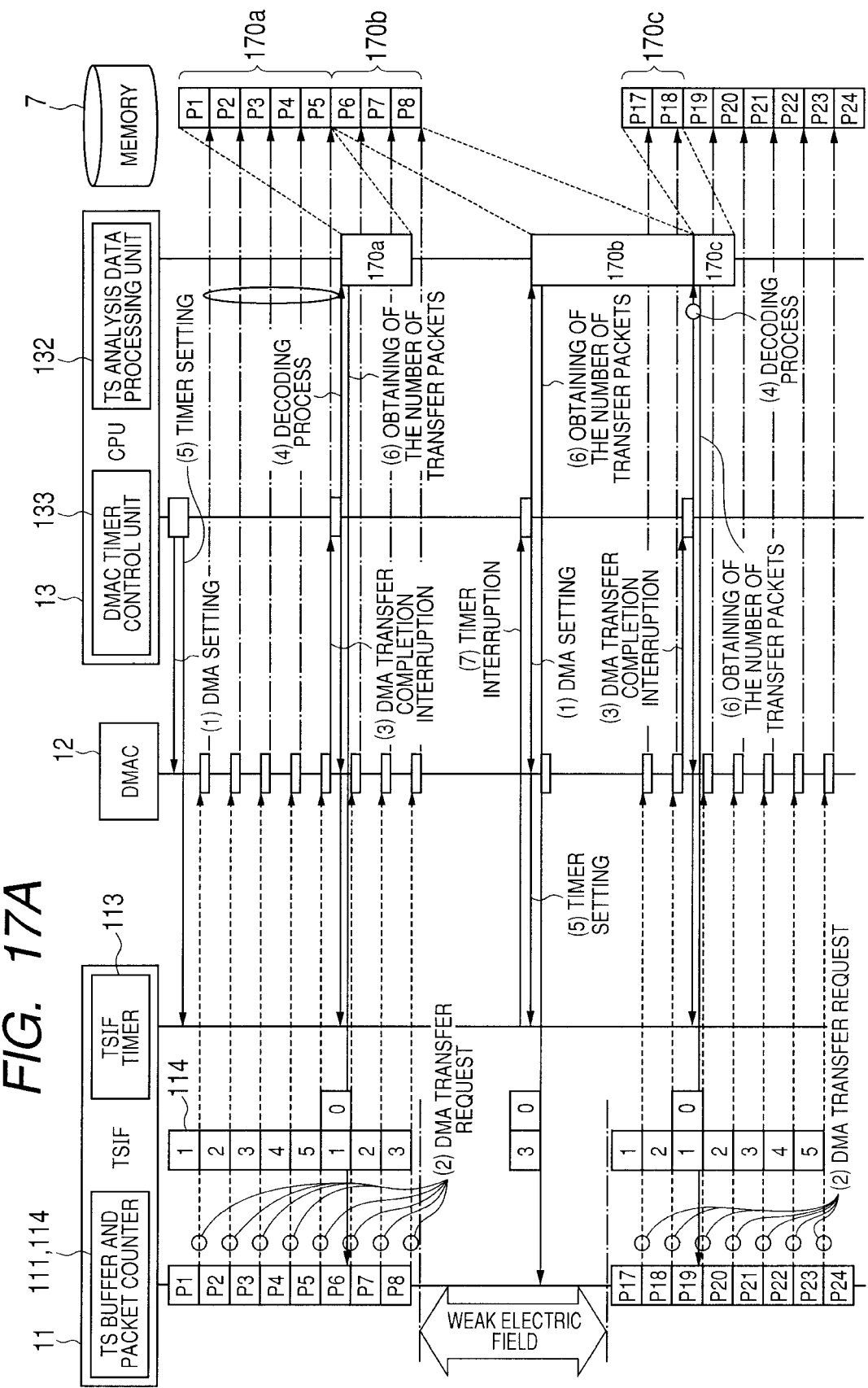

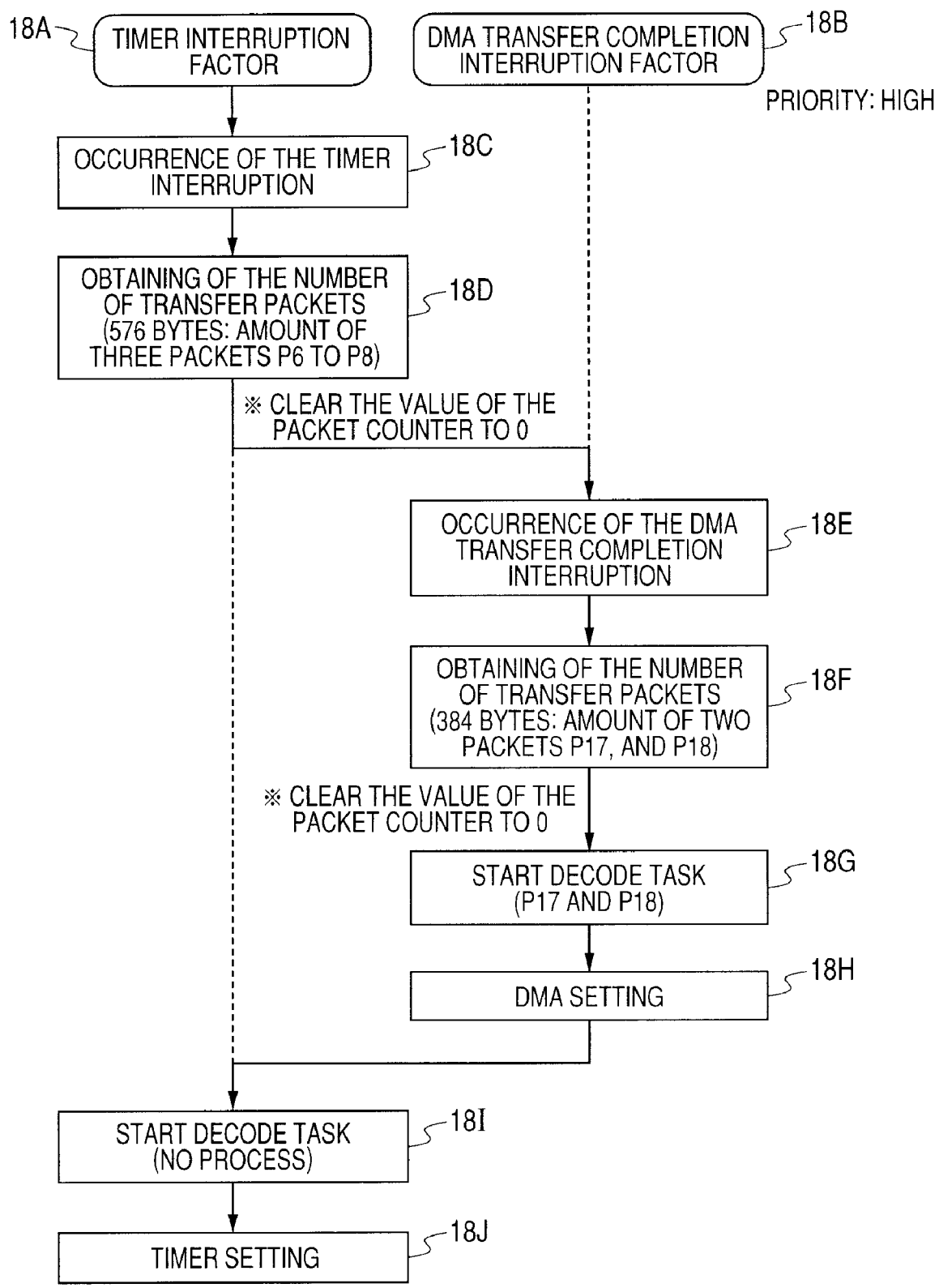

SEMICONDUCTOR INTEGRATED CIRCUIT

CROSS-REFERENCE TO RELATED APPLICATIONS

The disclosure of Japanese Patent Application No. 2009-130939 filed on May 29, 2009 including the specification, drawings and abstract is incorporated herein by reference in its entirety.

BACKGROUND OF THE INVENTION

The present invention relates to a semiconductor integrated circuit and, more particularly, to a technique effective to reduce burden applied at the time of solving a conflict in overlapping processes in processes for a plurality of interruption factors.

On Apr. 1, 2006, the one-segment partial reception service "One Seg" of the terrestrial digital broadcasting mainly for mobile terminals and the like started in Japan. In One Seg, broadcasting is performed by using one of segments obtained by dividing the frequency band of 6 MHz per physical channel to 13 segments, in 13 to 62 channels of the terrestrial digital broadcasting, thereby minimizing the information amount. Therefore, even a terminal having relatively low information processing capability such as a mobile terminal can properly receive the broadcasting. The feature of the service is that a terminal can receive sound and data broadcasting simultaneously.

The next-generation One Seg broadcasting called ISDB-Tmm aims for not only high-picture-quality high-sound-quality stream broadcasting but also new service such as video content download service more than One Seg. The ISDB-Tmm is abbreviation of Integrated Service Digital Broadcasting-Terrestrial for mobile multimedia.

In the terrestrial digital television broadcasting for mobile terminals, a transport stream TS conformed to the international standard MPEG-2 of motion picture coding is used. One packet of the transport stream TS conformed to MPEG-2 is configured by bit stream data of 188 bytes.

On the other hand, the patent document 1 discloses an application CPU mounted on a cellular phone and processing an MPEG-2 transport stream (hereinbelow, called MPEG2-TS) output from a digital television tuner that receives digital television broadcasting. An external storage can be coupled to the application CPU, and a DMAC for executing data transfer between the external storage and a control unit on the inside is included in place of the CPU core in the application CPU. The DMAC is abbreviation of Direct Memory Access Controller. The DMAC supplies a DMAC transfer completion interruption to the CPU core on completion of transfer of data of a set data amount. In response to the DMAC transfer completion interruption, the CPU core starts the process of the control unit on the inside.

Patent document 1: Japanese Unexamined Patent Publication No. 2007-201983

SUMMARY OF THE INVENTION

Prior to the present invention, the inventors herein had engaged in development of a semiconductor integrated circuit called an application processor to be mounted on a cellular phone terminal capable of receiving the next-generation One Seg broadcasting called ISDB-Tmm.

Since the next-generation One Seg broadcasting called ISDB-Tmm has to support video content download service, it is expected that the bit rate of the MPEG2-TS for the next-generation One Seg broadcasting becomes much higher than that of the standard One Seg broadcasting.

On the other hand, also in the application processor examined by the inventors herein in the development preceding the present invention, as described in the patent document 1, it is examined to internally provide the direct memory access controller (DMAC). A built-in DMAC executes data transfer between an external digital television tuner and an external memory in a state where the burden on the built-in CPU is low. On completion of data transfer as one packet of MPEG2-TS from the external digital television tuner to an external memory, the direct memory access controller (DMAC) supplies the DMAC transfer completion interruption to the built-in CPU.

On the other hand, the inventors herein have clarified a problem such that since the bit rate of the MPEG2-TS of the next-generation One Seg broadcasting becomes much higher than that of the standard One Seg broadcasting, the interval of the DMAC transfer completion interruptions from the built-in DMAC of the application processor to the built-in CPU becomes shorter, and the burden on the built-in CPU increases.

When it is assumed that, in the case where the maximum bit rate of MPEG2-TS of the standard One Seg broadcasting is 624 kbps, the DMAC transfer completion interruption occurs on completion of data transfer of one packet of MPEG2-TS, the interval of the DMAC transfer completion interruptions is 2.4 msec. In contrast, when it is assumed that, in the case where maximum bit rate of the next-generation One Seg broadcasting of ISDB-Tmm is 7 Mbps, the DMAC transfer completion interruption occurs on completion of data transfer of one packet of MPEG2-TS, the interval of the DMAC transfer completion interruptions is 214 μsec which is shorter.

FIG. 1 is a diagram showing the configuration of an application processor examined by the inventors of the present invention prior to the present invention.

An application processor 1 shown in FIG. 1 includes a transport stream interface (hereinbelow, called TSIF) 11, a direct memory access controller (hereinbelow, called DMAC) 12, a central processing unit (hereinbelow, called CPU) 13, a liquid crystal display (hereinbelow, called LCD) control unit 14, and a data bus 15. The application processor 1 also includes a timer 16, a memory interface 17, an MPEG decoder 18, and a sound output control unit 19.

A next-generation one-segment broadcasting of ISDB-Tmm is received by a digital television antenna 2 mounted on a cellular phone terminal, and packet data of MPEG2-TS is supplied from the output terminal of an external digital television tuner 3 to the input terminal of the TSIF 11 of the application processor 1. A system clock signal as a reference clock is supplied from an external system clock generator 4 to the TSIF 11.

The packet data of MPEG2-TS supplied to the TSIF 11 is transferred to an external memory 7 via the data bus 15 and the memory interface 17 by DMA transfer executed by the built-in DMAC 12. A high-speed large-capacity synchronous DRAM can be used as the external memory 7.

The built-in CPU 13 controls the internal operation of the application processor 1. By controlling demultiplex (DEMUX) process with the built-in CPU 13, the packet data of MPEG2-TS stored in the external memory 7 is separated to a video elementary stream and a sound elementary stream. The separated video elementary stream and the sound elementary stream are decoded by the MPEG decoder 18 to a video reproduction signal and a sound reproduction signal. Output synchronization of the video reproduction signal is executed by the LCD control unit 14, output synchronization of the sound reproduction signal is executed by the sound output control unit 19, and video display and sound output can be realized by an eternal liquid crystal display (hereinbelow, called LCD) 5 and an external speaker 6.

FIG. 2 is a diagram showing the configuration of the transport stream interface (TSIF) 11 included in the application processor 1 illustrated in FIG. 1.

The TSIF 11 shown in FIG. 2 is configured by a time stamp adding unit 110, a TS (Transport Stream) buffer 111, and a DMAC control unit 112.

The time stamp adding unit 110 adds a time stamp generated from the system clock signal as a reference clock supplied from the external system clock generator 4 to the packet data of MPEG2-TS supplied from the output terminal of the external digital television tuner 3. The MPEG2-TS to which the time stamp generated from the output of the time stamp adding unit 110 is added is temporarily stored in the TS buffer 111 and then supplied to the DMAC control unit 112. The DMAC control unit 112 outputs a DMAC transfer request to the DMAC 12 according to a data storage amount of the MPEG2-TS in the TS buffer 111. One packet of the MPEG2-TS used as a data format of the digital television broadcasting is made of 188 bytes. When the MPEG2-TS of one packet made of 188 bytes is received, the time stamp adding unit 110 adds timestamp information of four bytes to the MPEG2-TS of one packet, thereby generating a timestamp transport stream (TTS) of 192 bytes.

The TS buffer 111 is configured by a small-capacity memory for storing the timestamp transport stream (TTS) generated by the time stamp adding unit 110. For example, the TS buffer 111 can be configured by a two-face built-in RAM of 192 bytes or a four-face built-in RAM of 192 bytes.

The DMAC control unit 112 outputs a DMAC transfer request to the DMAC 12 according to the data storage amount of MPEG2-TS in the TS buffer 111. For example, when the timestamp transport stream (TTS) of one packet made of 192 bytes is stored in the TS buffer 111, the DMAC control unit 112 outputs a DMAC transfer request to the DMAC 12.

In the case where a next-generation one-segment broadcasting such as ISDB-Tmm is received by a cellular phone terminal, an electric wave state changes, so that a state where the electric wave can be received (strong electric field) and a state where the electric wave cannot be received (weak electric field) may occur. When a cellular phone terminal sequentially receives the MPEG2-TS of the next one-segment broadcasting, the TS buffer 111 does not become empty. However, in the state of the weak electric wave, the MPEG2-TS cannot be received, and the possibility that the TS buffer 111 becomes empty is high.

FIG. 3 is a diagram for explaining the flow of the MPEG2-transport stream (MPEG2-TS) in the application processor 1 shown in FIG. 1.

The MPEG2-TS received by the external digital television tuner 3 is supplied to the TSIF 11 by flow (1), DMA-transferred from the TSIF 11 to the DMAC 12 by flow (2), and DMA-transferred from the DMAC 12 to the external memory 7 by flow (3).

FIG. 4 is a diagram showing the flow of the MPEG2-TS illustrated in FIG. 3, observed at the points of the external digital television tuner 3, the TSIF 11, the DMAC 12, and the external memory 7 in the application processor 1 shown in FIG. 1.

One packet of the MPEG2-TS received by the external digital television tuner 3 is made of 188 bytes, and the MPEG2-TS is supplied from the tuner 3 to the TSIF 11 by the flow (1).

In the TSIF 11, the timestamp information of four bytes is added to the MPEG2-TS made of 188 bytes per packet, thereby generating the timestamp transport stream (TTS) of 192 bytes. The TTS is DMA-transferred from the TSIF 11 to the DMAC 12 by the flow (2).

The timestamp transport stream (TTS) supplied to the DMAC 12 is DMA-transferred to the external memory 7 by flow (3).

The flows (1), (2), and (3) forming the flow of the MPEG2-TS shown in FIG. 4 form a pipeline data transfer process flow. Specifically, each of processors of the external digital television tuner 3, the TSIF 11, the DMAC 12, and the external memory 7 executes a process of transmitting data of one packet to the next processor after the process of receiving data of one packet. Therefore, when the TSIF 11 cannot receive the MPEG2-TS due to weak electric field or the like, data is not DMA-transferred from the TSIF 11 to the DMAC 12.

FIG. 5 is a diagram for explaining control of the flow of the MPEG2-TS in the application processor 1 shown in FIG. 1.

In the first DMA setting (1), a DMA control processing unit 131 of the CPU 13 sets the number of bytes of the data to be DMA-transferred from the TSIF 11 to the external memory 7 by the DMAC 12 into the DMAC 12.

Next, in the DMA transfer request (2), a signal for requesting the DMAC 12 to perform the DMA transfer from the TSIF 11 to the external memory 7 by the TSIF 11 is generated.

In the DMA transfer completion interruption (3), on completion of the DMA transfer of an amount of bytes which are set by the DMA setting (1), the DMAC 12 notifies the DMA control processing unit 131 in the CPU 13 of the DMA transfer completion, and interruption to the CPU 13 starts.

FIG. 6 is a diagram showing control on the flow of the MPEG2-TS in the case of strong electric field, which is finely observed at the points of the TSIF 11, the DMAC 12, the CPU 13, and the external memory 7 in the application processor 1 illustrated in FIG. 1.

First, the DMA control processing unit 131 of the CPU 13 executes the DMA setting (1) on the DMAC 12. The DMAC 12 comes to wait for the DMAC transfer request from the TSIF 11.

Next, on completion of reception of the first packet P1 of the MPEG2-TS in the TS buffer 111 in the TSIF 11, the TSIF 11 outputs the DMA transfer request (2) to the DMAC 12.

In response to the DMA transfer request (2), the DMAC 12 reads the first packet P1 temporarily stored in the TS buffer 111 in the TSIF 11 and executes the DMA transfer to the external memory 7.

The DMAC 12 notifies the DMA control processing unit 131 of the DMA transfer completion interruption (3). In response to the DMA transfer completion interruption, a TS analysis data processing unit 132 in the CPU 13 executes the decoding process (4) including transport stream analysis and data process.

With respect to the MPEG2-TS from the second packet P2 to the fifth packet P5, by packet reception in the TS buffer 111 in the TSIF 11, packet reading, and DMA transfer to the external memory 7 by the DMAC 12, transfer of the DMA transfer data of the number of bytes corresponding to the size set by the DMA setting (1) is completed. Further, with respect to the MPEG2-TS from the second packet P2 to the fifth packet P5, the decoding process by the CPU 13 is also completed. Further, also with respect to the subsequent packets P6 to P10 in the MPEG2-TS, processes similar to the above are repeated.

FIG. 7 is a diagram showing control on the flow of the MPEG2-TS in the case of weak electric field, which is finely observed at the points of the TSIF 11, the DMAC 12, the CPU 13, and the external memory 7 in the application processor 1 illustrated in FIG. 1.

In FIG. 7, with respect to the MPEG2-TS from the first packet P1 to the third packet P3 like in FIG. 6 during the strong electric field before the weak electric field, packet reception in the TS buffer 111 in the TSIF 11, packet reading, and the DMA transfer to the external memory 7 by the DMAC 12 are completed.

That is, also in FIG. 7, in a manner similar to FIG. 6, the DMA control processing unit 131 in the CPU 13 executes the DMA setting (1) on the DMAC 12. The DMAC 12 comes to wait for the DMAC transfer request from the TSIF 11. Next, on completion of reception of the first packet P1 of the MPEG2-TS in the TS buffer 111 in the TSIF 11, the TSIF 11 outputs the DMA transfer request (2) to the DMAC 12.

Also in FIG. 7, in response to the DMA transfer request (2), the DMAC 12 reads the first packet P1 temporarily stored in the TS buffer 111 in the TSIF 11 and executes the DMA transfer to the external memory 7. Subsequently, the DMAC 12 notifies the DMA control processing unit 131 in the CPU 13 of the DMA transfer completion interruption (3). In response to the DMA transfer completion interruption, the TS analysis data processing unit 132 in the CPU 13 executes the decoding process (4) including transport stream analysis and data process.

With respect to the MPEG2-TS from the second packet P2 to the third packet P3, by packet reception in the TS buffer 111 in the TSIF 11, packet reading, and DMA transfer to the external memory 7 by the DMAC 12, transfer of the DMA transfer data of the number of bytes corresponding to the size set by the DMA setting (1) is completed. Further, with respect to the MPEG2-TS from the second packet P2 to the third packet P3, the decoding process by the CPU 13 is also completed.

However, with the weak electric field of FIG. 7, the MPEG2-TS from the fourth packet P4 to the eighth packet P8 is not received. Therefore, in the period of the weak electric field, the TSIF 11 cannot output the DMA transfer request (2) to the DMAC 12.

After that, when the weak electric field is reset to the strong electric field and reception of packets of the MPEG2-TS subsequent to the ninth packet P9 starts, the TSIF 11 restarts outputting the DMA transfer request (2) to the DMAC 12. As a result, in response to the DMA transfer request (2), the DMAC 12 reads the ninth packet P9 temporarily stored in the TS buffer 111 in the TSIF 11 and executes the DMA transfer to the external memory 7.

The DMAC 12 notifies the DMA control processing unit 131 in the CPU 13 of the DMA transfer completion interruption (3). In response to the notification of the interruption, the TS analysis data processing unit 132 in the CPU 13 executes the decoding process (4) including the transport stream analysis and the data process.

In such a manner, with respect to the MPEG2-TS from the ninth packet P9 to the tenth packet P10, the packet reception in the TS buffer 111 in the TSIF 11, the packet reading, the DMA transfer to the external memory 7 by the DMAC 12, and the decoding process by the CPU 13 are executed. By the operation, the transfer of the DMA transfer data of the number of bytes corresponding to the size of an amount of total 5-packets set in the DMA setting (1) and the decoding process are completed.

However, in the case of receiving and processing the MPEG2-TS of the next-generation one-segment broadcasting whose bit rate is much higher than that of the standard one-segment broadcasting by the packet processing flows of FIGS. 6 and 7, a problem such that the interruption interval between the DMAC transfer requests (2) becomes short was made clear by examination of the inventors of the present invention.

To solve the problem, prior to the invention, the inventors of the present invention had an idea of a method of notifying of an interruption every plural packets. In the method, the DMA transfer completion interruption (3) is notified once at the timing of completion of DMA transfer of a plurality of packets.

FIG. 8 is a diagram showing control on the flow of the MPEG2-TS in the case of strong electric field, which is finely observed at the points in the application processor illustrated in FIG. 1 by employing the method of notifying of an interruption every plural packets in order to solve the problem such that the interruption interval becomes shorter at the time of receiving a next-generation one-segment broadcasting.

Also in FIG. 8, in a manner similar to FIG. 6, first, the DMA control processing unit 131 in the CPU 13 executes the DMA setting (1) on the DMAC 12. In the DMA setting (1), for example, the DMA transfer data size of, for example, 5-packets (192 bytes×5) is designated. The DMAC 12 comes to wait for the DMAC transfer request from the TSIF 11.

Next, on completion of reception of the first packet P1 of the MPEG2-TS in the TS buffer 111 in the TSIF 11, the TSIF 11 outputs the DMA transfer request (2) to the DMAC 12. Further, in response to the DMA transfer request (2), the DMAC 12 reads the first packet P1 temporarily stored in the TS buffer 111 in the TSIF 11 and executes the DMA transfer to the external memory 7. Similarly, on completion of reception of each of the second packet P2, the third packet P3, the fourth packet P4, and the fifth packet P5 of the MPEG2-TS to the TS buffer 111 in the TSIF 11, the TSIF 11 outputs the DMA transfer request (2) to the DMAC 12. Further, in response to each DMA transfer request (2), the DMAC 12 reads data from the second packet P2 to the fifth packet P5 temporarily stored in the TS buffer 111 in the TSIF 11, and executes the DMA transfer to the external memory 7.

When the DMA transfer from the TSIF 11 to the external memory 7 by the DMAC 12 of data 80*a* from the first packet P1 to the fifth packet P5 is completed as described above, the DMAC 12 notifies the DMA control processing unit 131 in the CPU 13 of a DMA transfer completion interruption of the data 80*a* in the 5-packet unit (3). In response to the DMA transfer completion interruption every 5-packets, the TS analysis data processing unit 132 in the CPU 13 executes the decoding process (4) including the transport stream analysis and the data process on the data 80*a* in the 5-packet unit. Further, the DMA transfer completion interruption of the data in the 5-packet unit and the decoding process (4) including the TS analysis and data process on the data in the 5-packet unit are repeated also on data 80*b* and 80*c* of the subsequent packets P6 to P10 and P11 to P15 in the 5-packet unit in the MPEG2-TS.

FIG. 9 is a diagram showing control on the flow of the MPEG2-TS in the case where the strong electric field changes to the weak electric field, which is finely observed in the units in the application processor 1 illustrated in FIG. 1 when the method of notifying of an interruption every plural packets shown in FIG. 8 is employed.

Also in FIG. 9, in a manner similar to FIG. 8, with respect to data 90*a* from the packets P1 to P5 in the first 5-packet unit, reception in the TSIF 11, the DMA transfer from the TSIF 11 to the external memory 7 by the DMAC 12, and the decoding process including the TS analysis and the data process by the CPU 13 are executed. That is, also in FIG. 9, when each of the packets P1 to P5 in the first 5-packet unit is received by the TSIF 11, the DMA transfer request (2) is output from the TSIF 11 to the DMAC 12 on the packet, and the packet can be DMA transferred from the TSIF 11 to the external memory 7 by the DMAC 12. After that, the DMAC 12 notifies the DMA control processing unit 131 in the CPU 13 of the DMA transfer complete interruption of data 90a in the 5-packet unit (3), and the decoding process (4) including the TS analysis and the data process by the CPU 13 on the data in the 5-packet unit is executed.

In FIG. 9, on three packets P6 to P8 in data 90b in the second 5-packet unit, the reception in the TSIF 11 and the DMA transfer from the TSIF 11 to the external memory 7 by the DMAC 12 are executed so that the TSIF 11 outputs the DMA transfer request (2) to the DMAC 12 by reception of each packet unit.

After that, the strong electric field changes to the weak electric field during reception in the TSIF 11, the MPEG2-TS in packets P9 to P16 included in the data 90b cannot be received by the TSIF 11. Therefore, during this period, the TSIF 11 cannot output the DMA transfer request (2) to the DMAC 12, so that the DMAC 12 is in a standby mode.

When the weak electric field changes to the strong electric field, two successive packets P17 and P18 in the data 90b are received by the TSIF 11. Therefore, the DMA transfer request (2) is output from the TSIF 11 to the DMAC 12 on each of the received two packets P17 and P18, so that each of the packets can be transferred from the TSIF 11 to the external memory 7 by the DMAC 12.

At last, the DMAC 12 notifies the DMA control processing unit 131 in the CPU 13 of the DMA transfer completion interruption (3) of the data 90b in the 5-packet unit, and the decoding process (4) including the TS analysis and the data process by the CPU 13 on the data in the total 5-packet unit of the three packets P6, P7, and P8 before the weak electric field and two packets P17 and P18 after the weak electric field starts. However, in the decoding process, the data of the old three packets P6 to P9 in the data 90b on the 5-packet unit interrupted to be received by the weak electric field has to be discarded for the following reason.

In a digital TV broadcasting receiver, program time reference value information for synchronization and output time information for reproducing sound and video image are compared with each other to synchronize the reproducing operation of the receiver and a broadcast station. The program time reference value information is called a program clock reference (PCR). The output time information for reproducing sound and video image is called a presentation time stamp (PTS).

Therefore, in the case where program time reference value information PCR is included in the old three packets P6 to P9 before the weak electric field, the old time information has to be ignored. Otherwise, the old time information is reflected in the present program time reference value information PCR included in the new two packets P17 and P18 after the weak electric field, and it causes an erroneous operation. For example, a case where information of new sound and video image included in the new two packets P17 and P18 is not output (presented) due to the influence of old time information of the old three packets P6 to P9 before the weak electric field is also assumed.

The inventors of the present invention have clarified that, as described above, when the electric field becomes weak in the case of employing the method of notifying of an interruption every plural packets in reception of the next-generation one-segment broadcasting, the decoding process including the early TS analysis and the data process has to be started on the packets received before interruption of reception due to the weak electric field.

Prior to the present invention, the inventors of the present invention have reached the idea of adding a timer interruption to the DMA transfer completion interruption in the plural-packet unit in order to enable the decoding process including the early TS analysis and the data process on reception packets during reception interruption.

FIGS. 10A and 10B are diagrams showing control on the flow of the MPEG2-TS in the case where the strong electric field changes to the weak electric field, which is finely observed in the units in the application processor 1 illustrated in FIG. 1 when the DMA transfer completion interruption of every plural packets and the timer interruption are employed.

FIG. 10A is a diagram for explaining processes performed in the case where the time difference between the timer interruption (7) and the DMA transfer completion interruption (3) is relatively large, and the decoding process due to a timer interruption is disrupted. FIG. 10B is a diagram for explaining processes performed in the case where the time difference between the timer interruption (7) and the DMA transfer completion interruption (3) is relatively small.

The timer 16 included in the application processor 1 shown in FIG. 1 can be used for the timer interruption. Obviously, the timer 16 can be used also for another counting operation. The timer 16 included in the application processor 1 shown in FIG. 1 is controlled as follows at the time of a timer interruption.

As shown in FIGS. 10A and 10B, in response to the DMA transfer request (2) generated when the first packet P1 of the MPEG2-TS is received from the external digital television tuner 3 by the TSIF 11 in the application processor 1, a DMAC timer control unit 133 in the CPU 13 starts counting operation (timer operation) based on timer setting (5) in the timer 16. For example, since the timer 16 is configured by a counter, when the timer setting is performed by the DMAC timer control unit 133 in the CPU 13, the timer 16 executes the counting operation (timer operation). In the case where the DMAC transfer by the DMAC 12 of predetermined number of packets of MPEG2-TS is not completed during the predetermined count time by the counting operation, the timer 16 executes the timer interruption (7) for the DMAC timer control unit 133 in the CPU 13. In response to the timer interruption (7), the CPU 13 starts the decoding process (4) including the early transport stream (TS) analysis and the data process of the packets which are DMAC-transferred to the external memory 7. Prior to the timer setting (5) in the timer 16, the DMAC timer control unit 133 in the CPU 13 executes the DMA setting (1) in the DMAC 12. By the DMA setting (1), the predetermined number of plural packets to be DMAC transferred by the DMAC 12 is set to a plurality of packets, for example, five packets as the interruption notification unit.

Also in FIGS. 10A and 10B, in a manner similar to FIG. 9, on data 100a of the packets P1 to P5 in the first 5-packet unit, reception in the TSIF 11, the DMA transfer from the TSIF 11 to the external memory 7 by the DMAC 12, and the decoding process including the TS analysis and the data process by the CPU 13 are executed. Since the operation in FIGS. 10A and 10B is similar to that in FIG. 9, the detailed explanation will now be repeated.

Also in FIGS. 10A and 10B, in a manner similar to FIG. 9, on the three packets P6 to P8 in data 100b in the second 5-packet unit, reception in the TSIF 11 and the DMA transfer from the TSIF 11 to the external memory 7 by the DMAC 12 are executed. After that, the strong electric field is changed to the weak electric field, and a reception interruption state in which the MPEG2-TS of the packets P9 to P16 included in the data 100b cannot be received by the TSIF 11 is set.

In the process of FIG. 9, since the TSIF 11 cannot output the DMA transfer request (2) to the DMAC 12 during the reception interruption state, the DMAC 12 enters a standby state, erroneous reproduction time information is output at restart of reception after the electric field returns to the strong electric field, and it causes an erroneous operation.

In contrast, in the processes of FIGS. 10A and 10B, by counting operation (timer operation) based on the timer setting (5) responding to the DMA transfer request (2) generated on reception of the first packet P6 in the data 100b in the second 5-packet unit received before the reception interruption state by the weak electric field, the timer interruption (7) occurs according to the timer 16 in the reception interruption state. That is, in the reception interruption state by the weak electric field between the second reception packet data 100b and the third reception packet data 100c, DMAC transfer of predetermined number of transfers by the DMAC 12 is not completed in predetermined count time by the counting operation of the timer 16. Therefore, in response to the timer interruption (7) by the timer 16 in the reception interruption state, the CPU 13 starts the decoding process (4) including the early TS analysis and the data process on the three packets P6, P7, and P8 included in the second reception packet data 100b which has been DMAC-transferred to the external memory 7. Prior to the decoding process (4), the TS analysis data processing unit 132 in the CPU 13 obtains the number of transfer packets (6) and recognizes the number of packets P6, P7, and P8 included in the second reception packet data 100b which has been DMAC-transferred to the external memory 7.

Also in FIGS. 10A and 10B, in a manner similar to FIG. 9, when the electric field returns from the weak electric field to the strong electric field, two packets P17 and P18 in the third reception packet data 100c are received by the TSIF 11. Therefore, with respect to each of the two packets P17 and P18 received, the DMA transfer request (2) is output from the TSIF 11 to the DMAC 12, and each of the packets can be DMA transferred from the TSIF 11 to the external memory 7 by the DMAC 12. When the DMA transfer of the two packets P17 and P18 to the external memory 7 by the DMAC 12 is completed in such a manner, the DMAC 12 notifies the DMA control processing unit 131 in the CPU 13 of the DMA transfer completion interruption (3). The DMA transfer completion interruption (3) indicates completion of the DMA transfer of total five packets before the reception interruption state due to the weak electric field and after restart of reception. That is, the total five packets which have been DMA-transferred are three packets P6, P7, and P8 in the second reception packet data 100b before the reception interruption state due to the weak electric field and the two packets P17 and P18 in the third reception packet data 100c after restart of reception. The TS analysis data processing unit 132 in the CPU 13 executes the decoding process (4) including the transport stream analysis and the data process on the two packets P17 and P18 on the third reception packet data 100c which is not processed in the total five packets.

As described in FIGS. 10A and 10B, in the case of employing the plurality of interruptions of the DMA transfer completion interruption in the plural-packet unit and the timer interruption, to avoid conflict of processes when a plurality of interruptions occur at about the same time, a method of prioritizing the plurality of interruptions is generally employed. However, even when a plurality of interruptions occur at about the same time, actually, a time difference occurs. The inventors clarifies from examinations and the like that, in the case where an interruption having high priority occurs first, there is no contradiction in the processes. However, in the case where an interruption having low priority occurs first, a contradiction in the processes occurs.

FIG. 11 is a diagram illustrating processes performed in the case where priority on the DMA transfer completion interruption is set to be higher than that on the timer interruption by the process of FIGS. 10A and 10B and the DMA transfer completion interruption having higher priority occurs before the timer interruption.

As shown in FIG. 11, as a plurality of interruption factors, a timer interruption factor 11A and a DMA transfer completion interruption factor 11B exist. A DMA transfer completion interruption having high priority occurs 11C before a timer interruption 11E having low priority.

In response to the occurrence 11C of the DMA transfer completion interruption 11C having high priority, the TS analysis data processing unit 132 in the CPU 13 performs obtaining 11D of the number of transfer packets (6), and recognizes the number of packets included in reception packet data which was DMA transferred to the external memory 7. As an example, it is assumed that the five packets P6 to P10 of total 960 bytes in the second reception packet data 100b have been DMA transferred to the external memory 7. Therefore, five packets are obtained as the number of transfer packets in the obtaining 11D of the number of transfer packets. At this time, the number of transfer packets is obtained from the difference between the transfer packet index of last time and the transfer packet index obtained this time. Since the five packets P6 to P10 are received at this time, the number of transfer packets of 960 bytes is obtained.

After the obtaining 11D of the number of transfer packets, the timer interruption having low priority occurs 11E. Until the process of occurrence 11C of the DMA transfer completion interruption having high priority is finished, the timer interrupting process enters a standby state. In the following step 11F, a transfer packet index is updated so as to be used for interruption of the next time.

In the following step 11G, the TS analysis data processing unit 132 in the CPU 13 starts a task of the decoding process (4) including the transport stream analysis and the data process of the five packets P6 to P10. In the following step 11H, the DMAC timer control unit 133 in the CPU 13 executes the DMA setting (1).

When the process on the occurrence 11C of the DMA transfer completion interruption having high priority is finished, in the following step 11I, the process on the timer interruption having low priority is started. In the step 11I, the TS analysis data processing unit 132 of the CPU 13 executes obtaining of the number of transfer packets (6). However, since the number of packets of reception packet data which has been DMAC-transferred to the external memory 7 is zero at this time, the number of transfer packets obtained is 0 byte. Therefore, in the following step 11J, the transfer packet index is updated to 0 byte. Further, in step 11K, the TS analysis data processing unit 132 of the CPU 13 starts the task of the decoding process (4) including the transport stream analysis and the data process. However, the number of transfer packets obtained in step 11I is 0 byte at this time, so that the decoding process (4) is not actually executed.

Since the timer interruption process having low priority is executed as described above, the DMAC timer control unit 133 of the CPU 13 executes the timer setting (5) in the following step 11L.

FIGS. 12A and 12B are diagrams illustrating processes performed in the case where the timer interruption having low priority occurs before the DMA transfer completion interruption when the priority of the DMA transfer completion interruption is set to be higher than that of the timer interruption in the process of FIGS. 10A and 10B.

FIG. 12A is a diagram illustrating processes performed in the case where the time difference between occurrence 12C of the timer interruption having low priority and occurrence 12E of the DMA transfer completion interruption having high priority is relatively large and the decoding process due to the timer interruption is disrupted. FIG. 12B is a diagram illustrating processes performed in the case where the time difference between occurrence 12C of the timer interruption having low priority and the occurrence 12E of the DMA transfer completion interruption having high priority is relatively small.

First, in FIG. 12A, in a manner similar to FIG. 11, the timer interruption factor 12A and the DMA transfer completion factor 12B exist as the plurality of interruption factors. The occurrence 12C of the timer interruption having low priority is before the occurrence 12E of the DMA transfer completion interruption having high priority.

In response to the occurrence 12C of the timer interruption having low priority, the TS analysis data processing unit 132 in the CPU 13 performs obtaining 12D of the number of transfer packets (6), and recognizes the number of packets included in reception packet data which was DMA transferred to the external memory 7. As an example, it is assumed that the three packets P6 to P8 of total 576 bytes in the second reception packet data 100b before the reception interruption state shown in FIGS. 10A and 10B have been DMA-transferred to the external memory 7. Therefore, 576 bytes of the amount of three packets are obtained as the number of transfer packets in the obtaining 12D of the number of transfer packets.

When the decoding process due to the timer interrupt is disrupted immediately after the obtaining 12D of the number of transfer packets responding to the occurrence 12C of the timer interruption having low priority, the DMA transfer completion interruption having high priority occurs 12E. Therefore, until the process of the occurrence 12E of the DMA transfer completion interruption having high priority is finished, the process of the occurrence 12C of the timer interruption is set in the standby state. As a result, the process of the occurrence 12E of the DMA transfer completion interruption having high priority starts. As an example, two packets P17 and P18 of total 384 bytes in the third reception packet data 100c after restart of reception shown in FIGS. 10A and 10B are obtained.

In response to the occurrence 12E of the DMA transfer completion interruption having high priority, the TS analysis data processing unit 132 in the CPU 13 performs the obtaining 12F of the number of transfer packets and obtains two packets P17 and P18 of total 384 bytes in the third reception packet data 100c which has been DMAC-transferred to the external memory 7.

According to the number of transfer packets obtained in the obtaining 12F of the number of transfer packets, the transfer packet index is updated to 384 bytes in step 12G. Further, in the following step 12H, the TS analysis data processing unit 132 in the CPU 13 starts a task of the decoding process (4) including the transport stream analysis and the data process of the two packets P17 and P18. In the following step 121, the DMAC timer control unit 133 in the CPU 13 executes the DMA setting (1).

After that, the TS analysis data processing unit 132 in the CPU 13 returns to the process on the occurrence 12C of the timer interruption having low priority. In step 12J, the transfer packet index is updated. However, 576 bytes of an amount of the three packets P6 to P8 was obtained as the number of transfer packets in the obtaining 12D of the number of transfer packets. Therefore, by the update of the transfer packet index in the step 12J, the transfer packet index is updated to 576 bytes of three old packets P6 to P8 obtained in the obtaining 12D of the number of transfer packets.

As a result, in the following step 12K, the TS analysis data processing unit 132 in the CPU 13 starts a task of the decoding process (4) including the transport stream analysis and the data process on the old three packets P6 to P8 and executes the decoding process. In the following step 12L, the DMAC timer control unit 133 in the CPU 13 executes the timer setting (5).

Since the timer interruption process having low priority is executed in such a manner, the DMAC timer control unit 133 in the CPU 13 executes the timer setting (5) in the following step 12L.

As described above, when the timer interruption 12D having low priority occurs before the DMA transfer completion interruption 12E having high priority as shown in FIG. 12A, the interrupting process is executed.

However, the inventors of the present invention have made examinations and clarified that the process performed for the plurality of interruption factors shown in FIG. 12A have the following problems.

First, as shown in 12M in FIG. 12A, a difference occurs between the number of transfer packets (576 bytes) obtained in the obtaining 12D of the number of transfer packets responding to the former occurrence 12C of the timer interruption having low priority and the number of transfer packets (384 bytes) obtained in the obtaining 12F of the number of transfer packets responding to the latter occurrence of the DMA transfer completion interruption having high priority.

Next, the decoding process (4) in step 12H and the decoding process (4) in step 12K are executed, and a reversing process as shown in 12N in FIG. 12A is performed.

According to the number of transfer packets obtained in the obtaining 12F of the number of transfer packets responding to the latter occurrence 12E of the DMA transfer completion interruption having high priority, the decoding process (4) on the two packets P17 and P18 of total 384 bytes in the reception packet data 100c received by the reception restart after the reception interruption can be executed in step 12H.

However, according to the number of transfer packets obtained in the obtaining 12D of the number of transfer packets responding to the former occurrence 12C of the timer interruption having low priority, the decoding process (4) is executed also on the old three packets P6 to P8 in the reception packet data 100b obtained before the reception interruption in step 12K. On the other hand, as described in the beginning, in the case where the program time reference value information PCR is included in the old three packets P6 to P9 before the weak electric field, the old time information has to be ignored. Otherwise, the old time information is reflected in the present program time reference value information PCR included in the new two packets P17 and P18 after the weak electric field, and it causes an erroneous operation. Concretely, an erroneous operation occurs such that old sound and video images are output twice and no new sound and new video image are output.

Also in FIG. 12B showing the case where the time difference between the occurrence 12C of the timer interruption having low priority and the occurrence 12E of the DMA transfer completion interruption having high priority is relatively small, in a manner similar to FIG. 12A of the case where the time difference is relatively large and the decoding process due to the timer interruption is disrupted, as a plurality of interruption factors, the timer interruption factor 12A and the DMA transfer completion interruption factor 12B exist. The occurrence 12C of the timer interruption having low priority is slightly ahead of the occurrence 12E of the DMA transfer completion interruption having high priority.

In response to the occurrence 12C of the timer interruption having low priority, the TS analysis data processing unit 132 in the CPU 13 performs the obtaining 12D of the number of transfer packets (6), and recognizes the number of packets included in the reception packet data which has been DMAC-transferred to the external memory 7. As an example, in FIGS. 10A and 10B, it is assumed that the electric field returns to the strong electric field immediately before occurrence of the timer interruption, and the DMA transfer completion interruption occurs. It is assumed that five packets are obtained and the timer interruption and the DMA transfer completion interruption occur at the same time. It is also assumed that the five packets P6 to P8, P17, and P18 of total 960 bytes in the second reception packet data 100b and 100c before the reception interruption state shown in FIGS. 10A and 10B have been DMAC-transferred to the external memory 7. Therefore, by the obtaining 12D of the number of transfer packets, 960 bytes of the amount of five packets is obtained as the number of transfer packets.

However, the occurrence 12E of the DMA transfer completion interruption having high priority follows immediately after the obtaining 12D of the number of transfer packets responding to the occurrence 12C of the timer interruption having low priority. Therefore, until the process of the occurrence 12E of the DMA transfer completion interruption having high priority is finished, the process of the occurrence 12C of the timer interruption is in the standby state. As a result, the process of the occurrence 12E of the DMA transfer completion interruption having high priority starts. As an example, the process is performed on the five packets P6 to P8, P17, and P18 of total 960 bytes in the second reception packet data 100b before the reception interruption state shown in FIGS. 10A and 10B and the third reception packet data 100c after restart of reception.

In response to the occurrence 12E of the DMA transfer completion interruption having high priority, the TS analysis data processing unit 132 in the CPU 13 performs the obtaining 12F of the number of transfer packets, and obtains the number of five packets P6 to P8, P17, and P18 of total 960 bytes in the second reception packet data 100b and the third reception packet data 100c which has been DMAC-transferred to the external memory 7.

According to the number of transfer packets obtained in the obtaining 12F of the number of transfer packets, the transfer packet index is updated in step 12G. Further, in the following step 12H, the TS analysis data processing unit 132 in the CPU 13 starts a task of the decoding process (4) including the transport stream analysis and the data process on the five packets P6 to P8, P17, and P18. In the subsequent step 121, the DMAC timer control unit 133 in the CPU 13 executes the DMA setting (1).

After that, the program returns to the process on the occurrence 12C of the timer interruption having low priority. In step 12J, the transfer packet index is updated. However, 960 bytes of an amount of the five packets P6 to P8, P17, and P18 was obtained as the number of transfer packets in the former obtaining 12D of the number of transfer packets. As a result, in the following step 12K, the TS analysis data processing unit 132 in the CPU 13 starts a task of the decoding process (4) including the transport stream analysis and the data process on the five packets P6 to P8, P17, and P18 to execute the decoding process. In the following step 12L, the DMAC timer control unit 133 in the CPU 13 executes the timer setting (5).

Since the timer interruption process having low priority is executed as described above, in the following step 12L, the DMAC timer control unit 133 in the CPU 13 executes the timer setting (5).

As described above, in the case where the timer interruption 12D having low priority is ahead of the DMA transfer completion interruption 12E having high priority as shown in FIG. 12B, the interruption process is executed.

However, the inventors of the present invention have made examinations and clarified that the process performed for the plurality of interruption factors shown in FIG. 12B have the following problems.

First, as shown in 12M in FIG. 12B, the transfer packets P6 to P8, P17, and P18 obtained in the obtaining 12D of the number of transfer packets responding to the former occurrence 12C of the timer interruption having low priority and the transfer packets P6 to P8, P17, and P18 obtained in the obtaining 12F of the number of transfer packets responding to the latter occurrence 11C of the DMA transfer completion interruption having high priority become the same packets as shown in 12M in FIG. 12B.

Next, the decoding process (4) in step 12H and the decoding process (4) in step 12K are executed, and an overlapping process as shown in 12N in FIG. 12B is performed.

According to the number of transfer packets obtained in the obtaining 12F of the number of transfer packets responding to the latter occurrence 12E of the DMA transfer completion interruption having high priority, the decoding process (4) on the five packets P6 to P8, P17 and P18 of total 960 bytes in the reception packet data 100b before the reception interruption state and the reception packet data 100c received by the reception restart after the reception interruption can be executed in step 12H.

In short, when the timer interruption and the data transfer completion interruption occur simultaneously, the same five packets are subject to an overlapping process of the decoding process performed due to the timer interruption and the decoding process performed due to the data transfer interruption. For example, an erroneous operation such that the same image is output twice occurs.

FIG. 13 is a diagram illustrating processes examined by the inventors herein prior to the present invention in order to solve the problem of the overlapping process in the process for the plurality of interruption factors shown in FIGS. 12A and 12B.

Also in FIG. 13, in a manner similar to FIGS. 12A and 12B, a timer interruption factor 13A and a DMA transfer completion factor 13B exist as the plurality of interruption factors. The occurrence 13C of the timer interruption having low priority is before the occurrence 13F of the DMA transfer completion interruption having high priority.

However, the processes show in FIG. 13 include a semaphore setting process in step 13D. The semaphore indicates an exclusion process for solving conflict in parallel processing.

Specifically, in response to the occurrence 13C of the timer interruption having low priority, the semaphore setting in step 13D is executed, thereby executing the timer interruption process (steps 13E and 13G to 13J) having low priority first. By executing a process (13K to 13N) responding to the occurrence 13F of the DMA transfer completion interruption having high priority later, the conflict in the overlapping process is solved.

In the process of FIG. 13, in response to the occurrence 13C of the timer interruption having low priority, the semaphore setting in step 13D is executed. During the semaphore process, the obtaining of the number of transfer packets in step 13E is executed. As an example, it is assumed that three packets P6 to P8 of total 576 bytes in the second reception packet data 100b before the reception interruption state shown in FIGS. 10A and 10B have been DMAC-transferred to the external memory 7. Therefore, by the obtaining 13E of the number of transfer packets, 576 bytes of three packets is obtained as the number of transfer packets.

After obtaining of the number of transfer packets in step 13E, there is the latter occurrence 13F of the DMA transfer completion interruption having high priority. However, by the semaphore setting in step 13D, it is inhibited that DMA transfer completion interruption processes 13K to 13N are executed before the subsequent process in FIG. 13, so that the steps 13E and 13G to 13J of the timer interruption steps are executed first.

In spite of the latter occurrence 13F of the DMA transfer completion interruption having high priority due to the semaphore setting in step 13D, in response to the former occurrence 13C of the timer interruption having low priority, the TS analysis data processing unit 132 in the CPU 13 executes the obtaining 13E of the number of transfer packets (6) to obtain the number of packets included in reception packet data which has been DMAC-transferred to the external memory 7. As an example, it is assumed that three packets P6 to P8 of total 576 bytes in the second reception packet data 100b before the reception interruption state shown in FIGS. 10A and 10B have been DMA-transmitted to the external memory 7. Therefore, by the obtaining 13E of the number of transfer packets, 576 bytes of the three packets P6 to P8 as the number of transfer packets is obtained.

According to the number of transfer packets obtained in the obtaining 13E of the number of transfer packets, the transfer packet index is updated to 576 bytes in step 13G. Further, in the following step 13H, the TS analysis data processing unit 132 in the CPU 13 starts a task of the decoding process (4) including the transport stream analysis and the data process of the three packets P6 to P8. In the following step 13I, the DMAC timer control unit 133 in the CPU 13 executes the timer setting (5). In the further following step 13J, semaphore release is executed.

When semaphore release is executed in step 13J, the process of FIG. 13 shifts to DAM transfer completion interruption process 13K to 13N. First, the obtaining 13K of the number of transfer packets (6) is executed to obtain two packets P17 and P18 of the total 384 bytes in the third reception packet data 100c which has been DMAC-transferred to the external memory 7.

According to the number of transfer packets obtained in the obtaining 13K of the number of transfer packets, the transfer packet index is updated to 384 bytes in step 13L. Further, in the following step 13M, the TS analysis data processing unit 132 in the CPU 13 starts a task of the decoding process (4) including the transport stream analysis and the data process of the two packets P17 and P18. In the following step 13N, the DMAC timer control unit 133 in the CPU 13 executes the DMA setting (1).

By execution of the process shown in FIG. 13, the decoding process (4) of the three packets P6 to P8 of total 576 bytes in the second reception packet data 100b as older one is executed first. The decoding process (4) of the packets P17 and P18 of total 384 bytes in the third reception packet data 100c as newer one is executed later. By executing the process shown in FIG. 13, a conflict in the overlapping process in the process for the plurality of interruption factors shown in FIGS. 12A and 12B can be solved.

However, by examinations made by the inventors herein prior to the present invention, a problem was clarified such that long process time is necessary for the semaphore setting in the step 13D and the semaphore release in the step 13J in the process shown in FIG. 13 and the process load on the DMAC timer control unit 133 in the CPU 13 becomes heavy.

Therefore, a problem occurs such that power consumption of a built-in CPU of a semiconductor integrated circuit such as an application processor mounted on a cellular phone terminal capable of receiving a next-generation one-segment broadcasting called ISDB-Tmm increases. In addition, control software of the built-in CPU for processing a plurality of interruption factors is complicated, and it causes a problem such that the capacity of a built-in nonvolatile memory for storing the software also increases.

The present invention has been achieved as a result of the examinations of the inventors herein prior to the present invention.

Therefore, an object of the present invention is to provide a semiconductor integrated circuit with reduced burden at the time of solving a conflict in an overlapping process in processes for a plurality of interruption factors.

The above and other objects and novel features of the present invention will become apparent from the description of the specification and the appended drawings.

Representative ones of inventions disclosed in the application will be briefly described as follows.

A representative semiconductor integrated circuit (1) of the present invention has a reception interface (11), a memory interface (17), a data transfer unit (12), and process units (13 and 18) (refer to FIG. 15).

When the data transfer unit (12) completes transfer of a plurality of pieces of reception packet data of predetermined number of packets from a buffer (111) to an external memory (7), a data transfer completion interruption is notified to the process units (13 and 18).

In the case where the data transfer of the plurality of pieces of reception packet data of the predetermined number of packets is not completed within predetermined count time by a timer 113 during reception interruption, a timer interruption is notified to the process units (13 and 18).

Before the process units (13 and 18) starts the process on a plurality of pieces of reception packet data stored in the external memory (7) in response to the data transfer completion interruption and the timer interruption, the process units (13 and 18) obtains the number of transfer packets from a packet counter (114).

After obtaining of the number of transfer packets from the packet counter (114) by the process units (13 and 18), the value of the packet counter (114) is reset to zero (refer to FIG. 14).

After restart of reception, the packet counter (114) stores the number of transfer restart packets of the restart reception packet data which is restarted to be transferred to the external memory (7) by the data transfer unit (12).

In response to the occurrence (18C) of timer interruption, the process unit obtains (18D) the number of transfer packets of the reception packet data stored in the external memory (7) before reception interruption from the packet counter (114), the data transfer completion interruption occurs (18E).

According to the number of transfer packets obtained from the packet counter by the process unit in response to the occurrence of the timer interruption, either the process (18I in FIG. 18A) responding to the occurrence (18C) of the timer interruption of the reception packet data stored in the external memory (7) before reception interruption or the process (18G in FIG. 18B) responding to the occurrence of the data transfer completion interruption of the plurality of pieces of reception packet data stored in the external memory (7) is omitted.

The effect obtained by the representative one of the inventions disclosed in the application will be briefly described as follows. That is, a semiconductor integrated circuit with lessened burden at the time of solving a conflict in the overlapping process in the process for a plurality of interruption factors can be provided.

BRIEF DESCRIPTION OF THE DRAWINGS

FIG. 2 is a diagram showing the configuration of a transport stream interface (TSIF) 11 included in the application processor 1 illustrated in FIG. 1.

FIG. 3 is a diagram illustrating the flow of an MPEG2-transport stream (MPEG2-TS) in the application processor 1 shown in FIG. 1.

FIGS. 10A and 10B are diagrams showing control on the flow of the MPEG2-TS in the case where the strong electric field changes to the weak electric field, which is finely observed in the units in the application processor 1 illustrated in FIG. 1 when the DMA transfer completion interruption of every plural packets and the timer interruption are employed.

FIG. 11 is a diagram illustrating processes performed in the case where the DMA transfer completion interruption having higher priority occurs before the timer interruption when the priority of the DMA transfer completion interruption is set to be higher than that on the timer interruption by the process of FIGS. 10A and 10B.

FIG. 16 is a diagram showing control on the flow of the MPEG2-TS in the case of the strong electric field, which is finely observed in the units in the application processor 1 illustrated in FIG. 15 including the TSIF 11 shown in FIG. 14.

FIGS. 17A and 17B are diagrams showing control on the flow of the MPEG2-TS in the case where the strong electric field changes to the weak electric field, which is finely observed in the units in the application processor 1 according to the example 1 of the invention illustrated in FIG. 15 when the DMA transfer completion interruption of every plurality packets and the timer interruption are employed.

FIGS. 18A and 18B are diagrams illustrating a process of reversing a preceding decoding process responding to the latter DMAC transfer completion interruption (3) having high priority and a subsequent decoding process responding to the timer interruption (7) having low priority in the process of FIGS. 17A and 17B, or a process of avoiding overlapping processes.

DETAILED DESCRIPTION OF THE PREFERRED EMBODIMENTS

1. Outline of Embodiments

Figure 1:
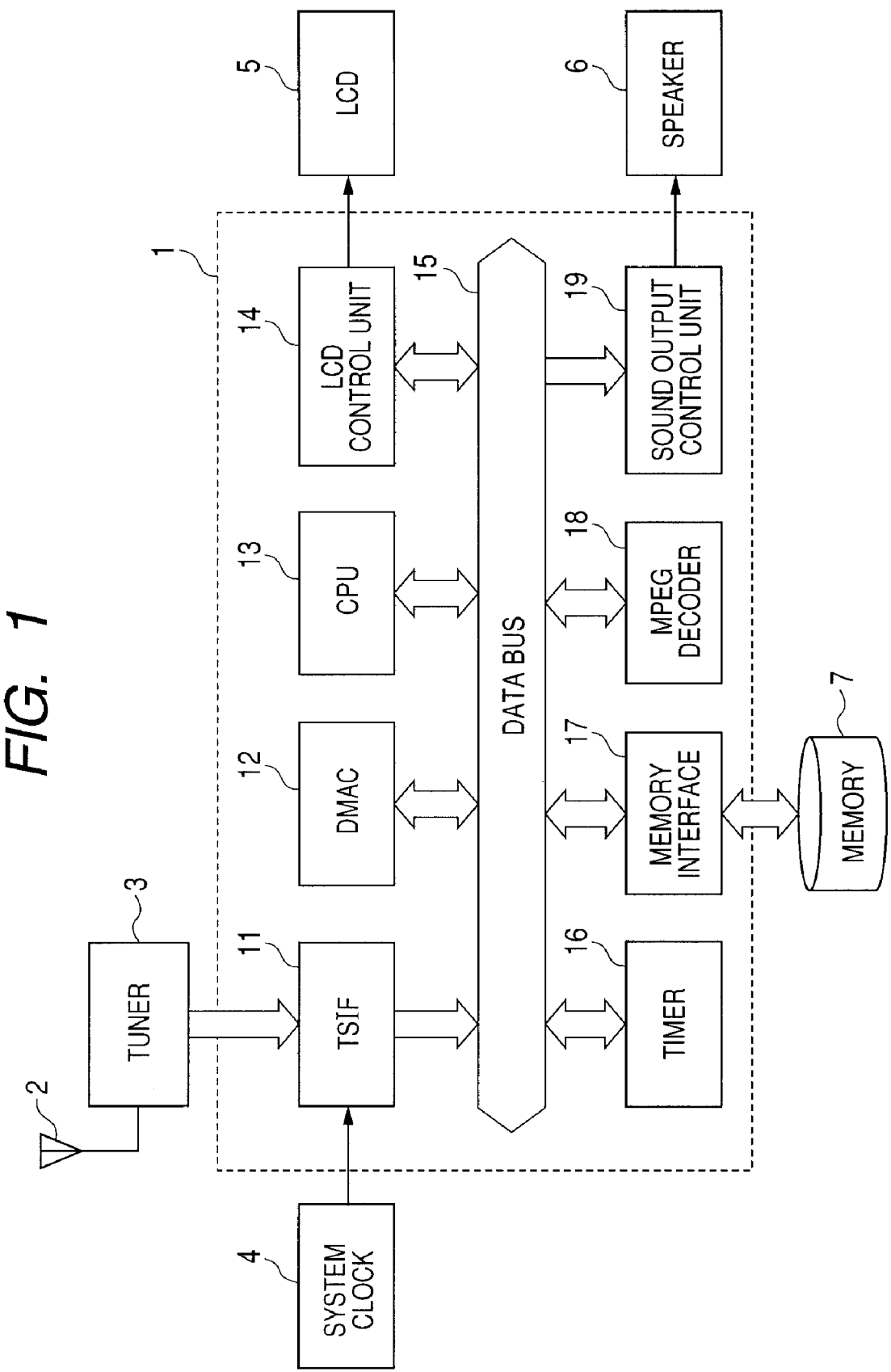
FIG. 1 is a diagram showing the configuration of an application processor examined by the inventors herein prior to the present invention.
Figure 4:
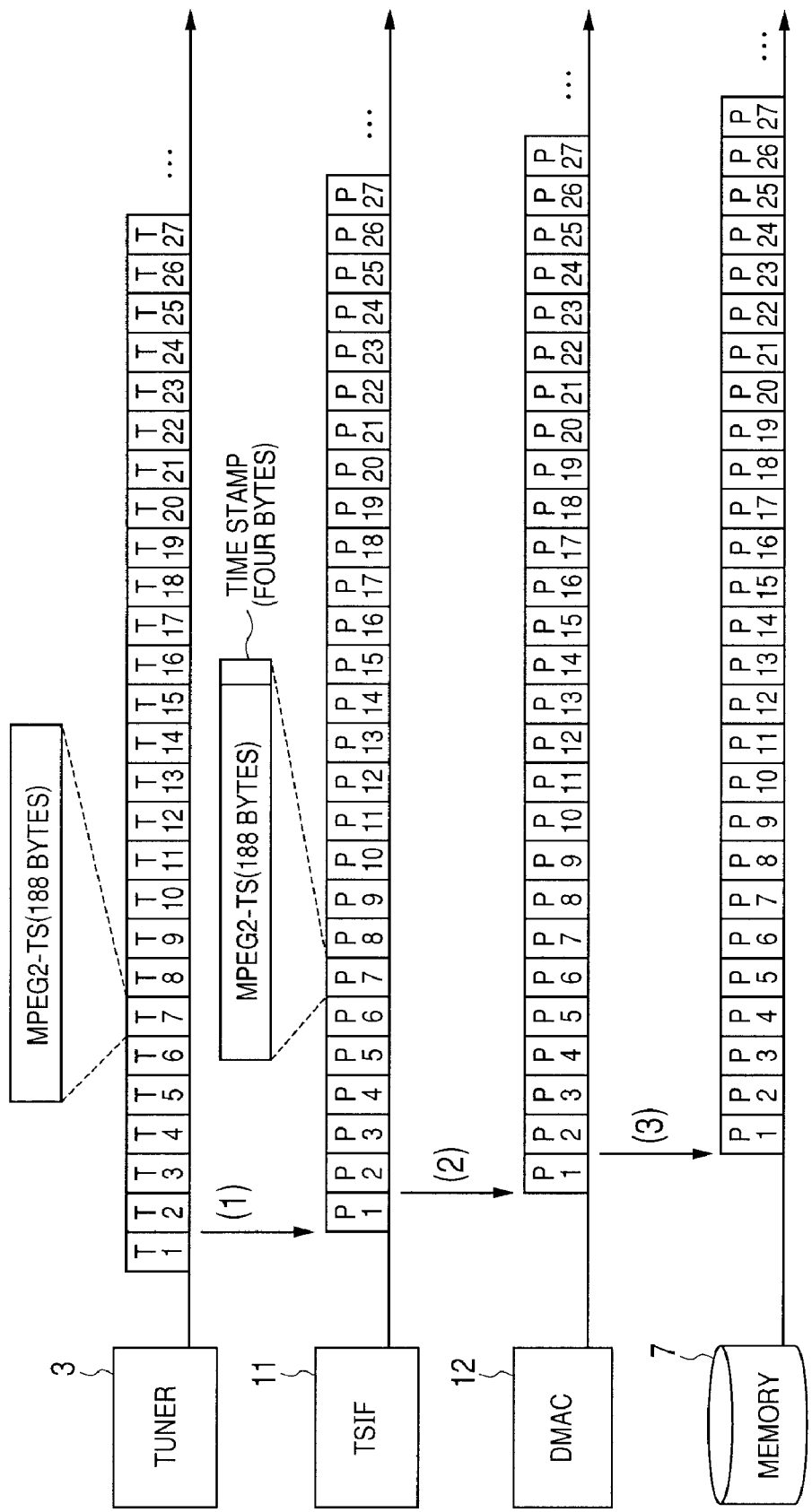
FIG. 4 is a diagram showing the flow of the MPEG2-TS illustrated in FIG. 3, observed at the points of an external digital television tuner 3, a TSIF 11, a DMAC 12, and an external memory 7 in the application processor 1 shown in FIG. 1.
Figure 5:
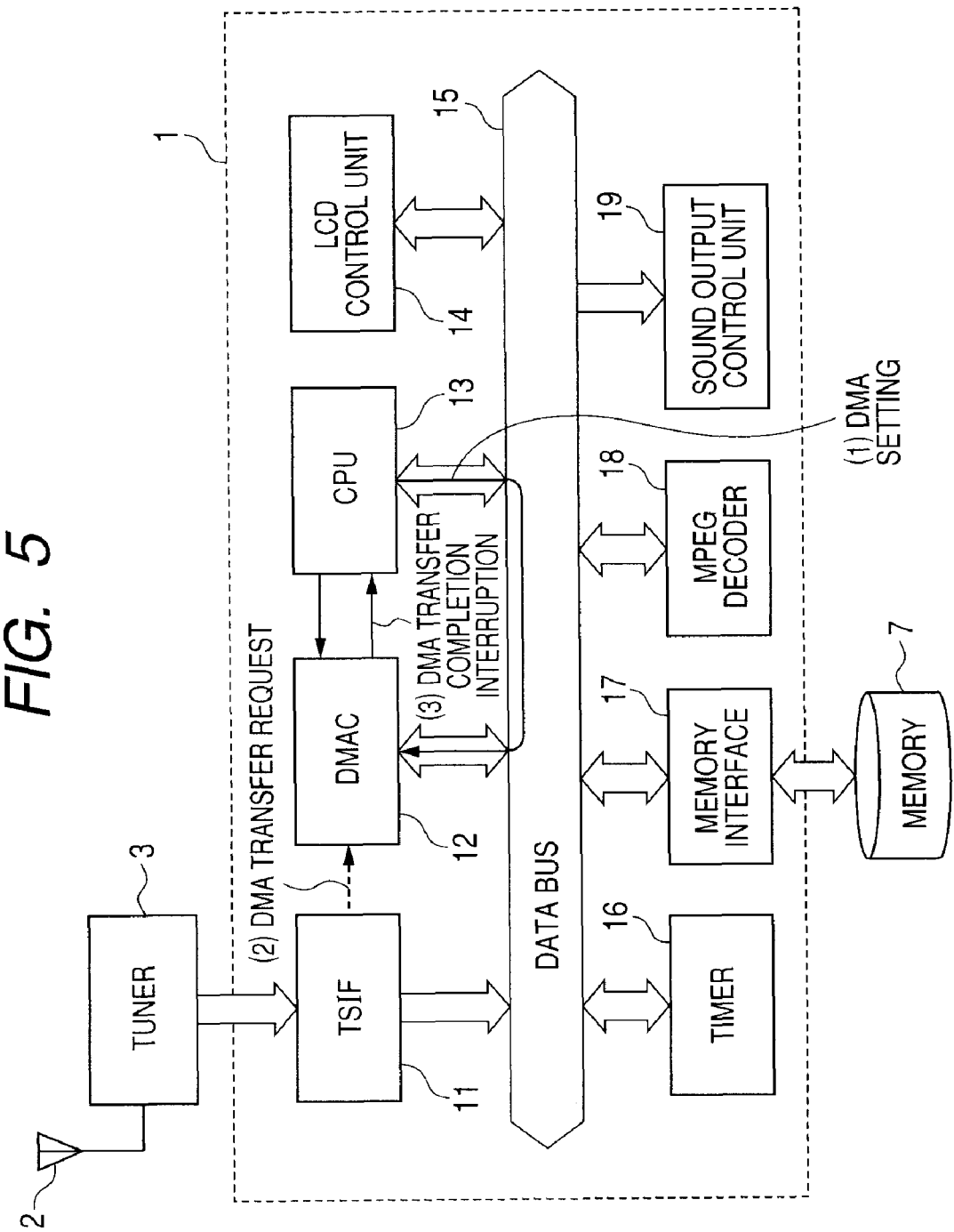
FIG. 5 is a diagram illustrating control on the flow of the MPEG2-TS in the application processor 1 shown in FIG. 1.
Figure 6:
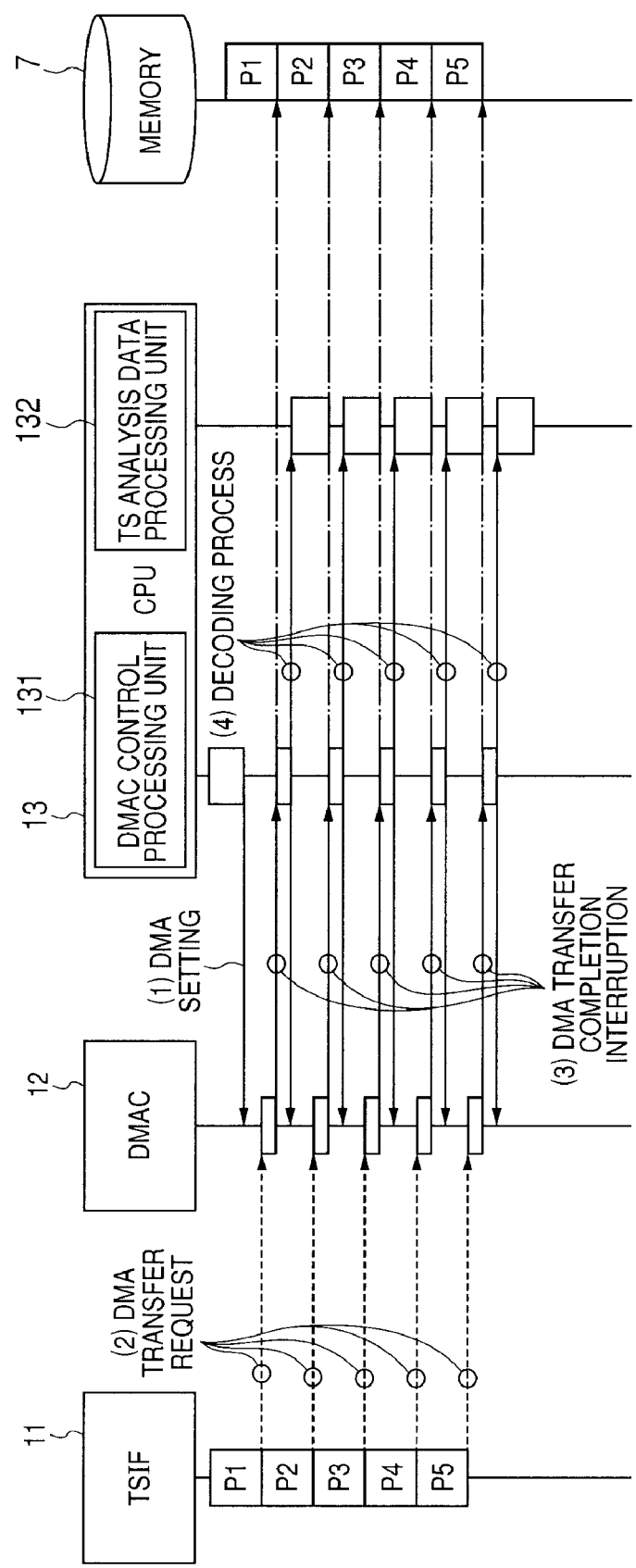
FIG. 6 is a diagram showing control on the flow of the MPEG2-TS in the case of strong electric field, which is finely observed at the points of the TSIF 11, the DMAC 12, the CPU 13, and the external memory 7 in the application processor 1 illustrated in FIG. 1.
Figure 7:
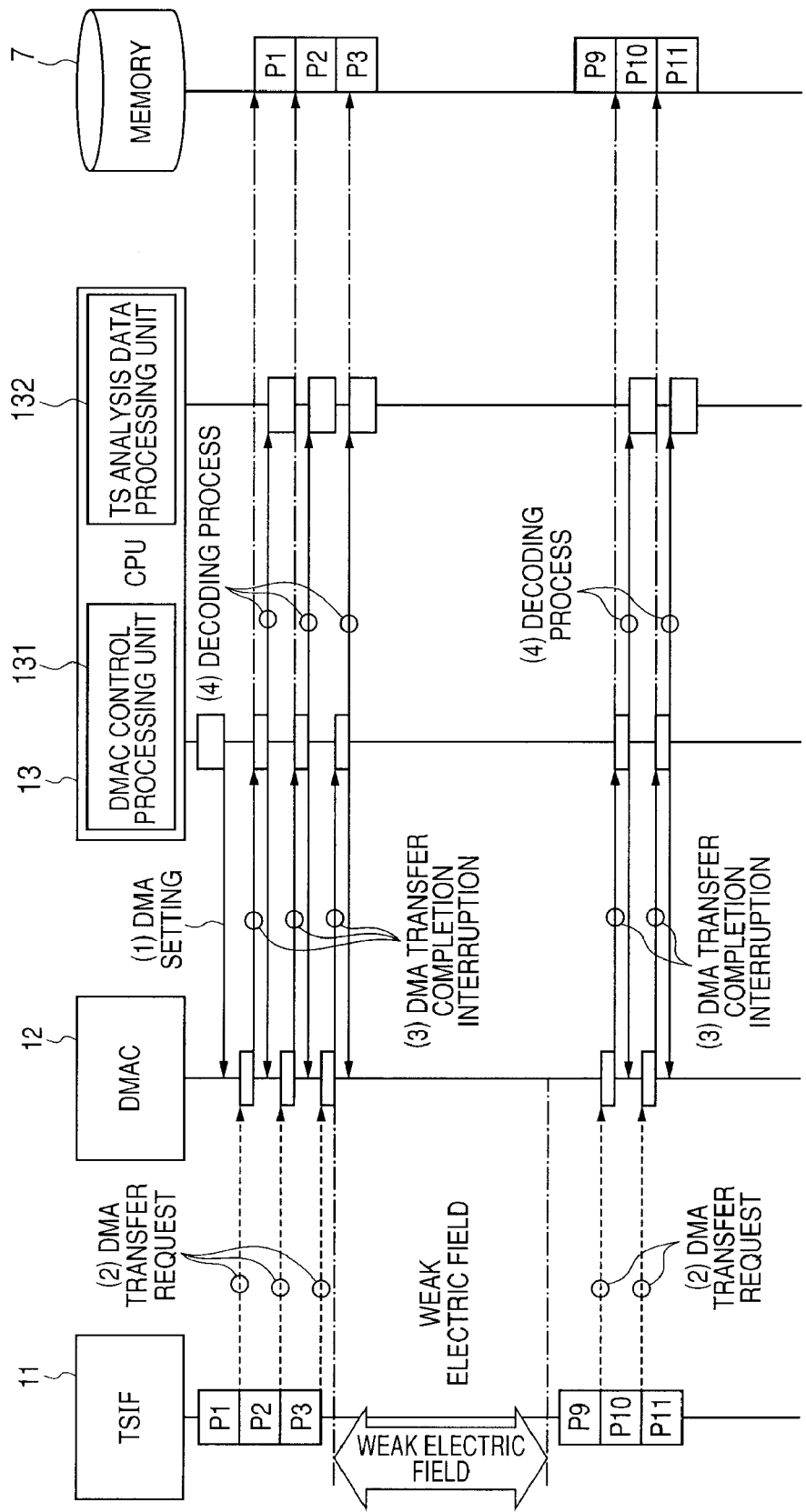
FIG. 7 is a diagram showing control on the flow of the MPEG2-TS in the case of weak electric field, which is finely observed at the points of the TSIF 11, the DMAC 12, the CPU 13, and the external memory 7 in the application processor 1 illustrated in FIG. 1.

First, outline of representative embodiments of the present invention disclosed in the application will be described. Reference numerals in drawings in parentheses referred to in description of the outline of the representative embodiments just illustrate components included in the concept of the components to which the reference numerals are designated.

1. A representative embodiment of the invention relates to a semiconductor integrated circuit (1) having a reception interface (11), a memory interface (17), a data transfer unit (12), and a process unit (13, 18).

The reception interface (11) includes a buffer (111) capable of sequentially storing a plurality of pieces of reception packet data (P1, P2, P3, . . . ), and a timer (113) performing counting operation.

The memory interface (17) can be coupled to an external memory (7).

The data transfer unit (12) can transfer the plurality of pieces of reception packet data stored in the buffer (111) to the external memory (7) coupled to the memory interface (17).

Figure 15:
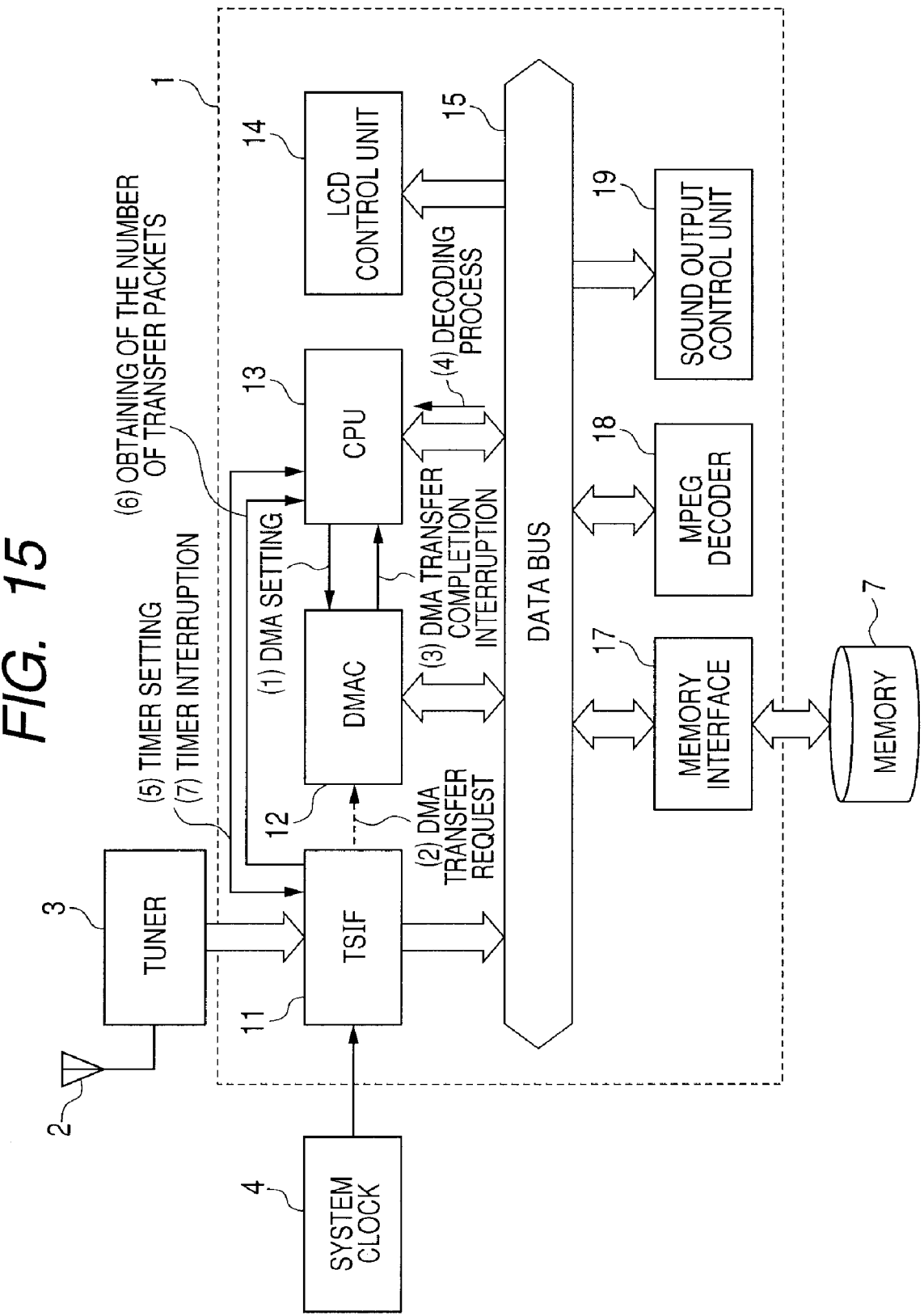
FIG. 15 is a block diagram showing the configuration of the application processor according to example 1 in the present invention.

The process unit (13, 18) can process the plurality of pieces of reception packet data transferred and stored to the external memory (7) (refer to FIG. 15).

When the data transfer unit (12) completes transfer of the plurality of pieces of reception packet data of predetermined number of packets from the buffer to the external memory, the data transfer unit (12) can notify the process unit (13, 18) of a data transfer completion interruption.

In response to occurrence of the data transfer completion interruption from the data transfer unit (12), the process unit (13, 18) can start processing the plurality of pieces of reception packet data stored in the external memory (7).

During interruption of reception of the plurality of pieces of reception packet data to the reception interface (11), the timer (113) executes the counting operation.

In the case where the data transfer of the plurality of pieces of reception packet data of the predetermined number of packets is not completed within predetermined count time by the counting operation during the reception interruption, the timer (113) can notify the process unit (13, 18) of a timer interruption.

Figure 17B:
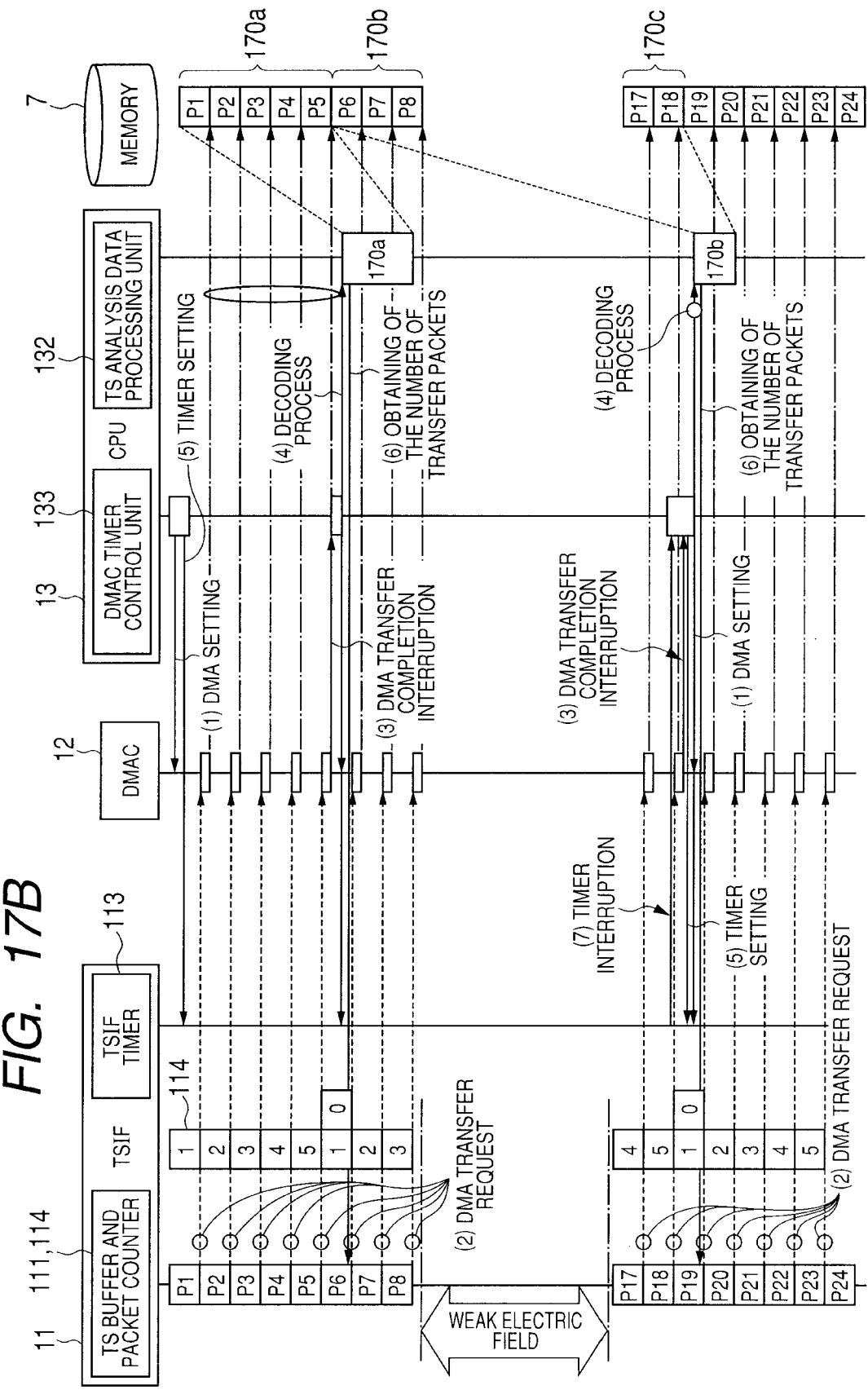

In response to occurrence of the timer interruption from the timer (113), the process unit (13, 18) can start processing reception packet data stored in the external memory (7) prior to the reception interruption (refer to FIGS. 17A and 17B).

The reception interface (11) further includes a packet counter (114) that stores the number of transfer packets of the reception packet data transferred to the external memory (7) by the data transfer unit (12).

Before the process unit (13, 18) starts processing the plurality of pieces of reception packet data stored in the external memory (7) in response to occurrence of the data transfer completion interruption, the process unit (13, 18) can obtain the number of transfer packets from the packet counter (114).

In response to occurrence of the timer interruption, before the process unit (13, 18) starts processing the reception packet data stored in the external memory (7) before the reception interruption, the process unit (13, 18) can obtain the number of transfer packets from the packet counter (114).

Figure 14:
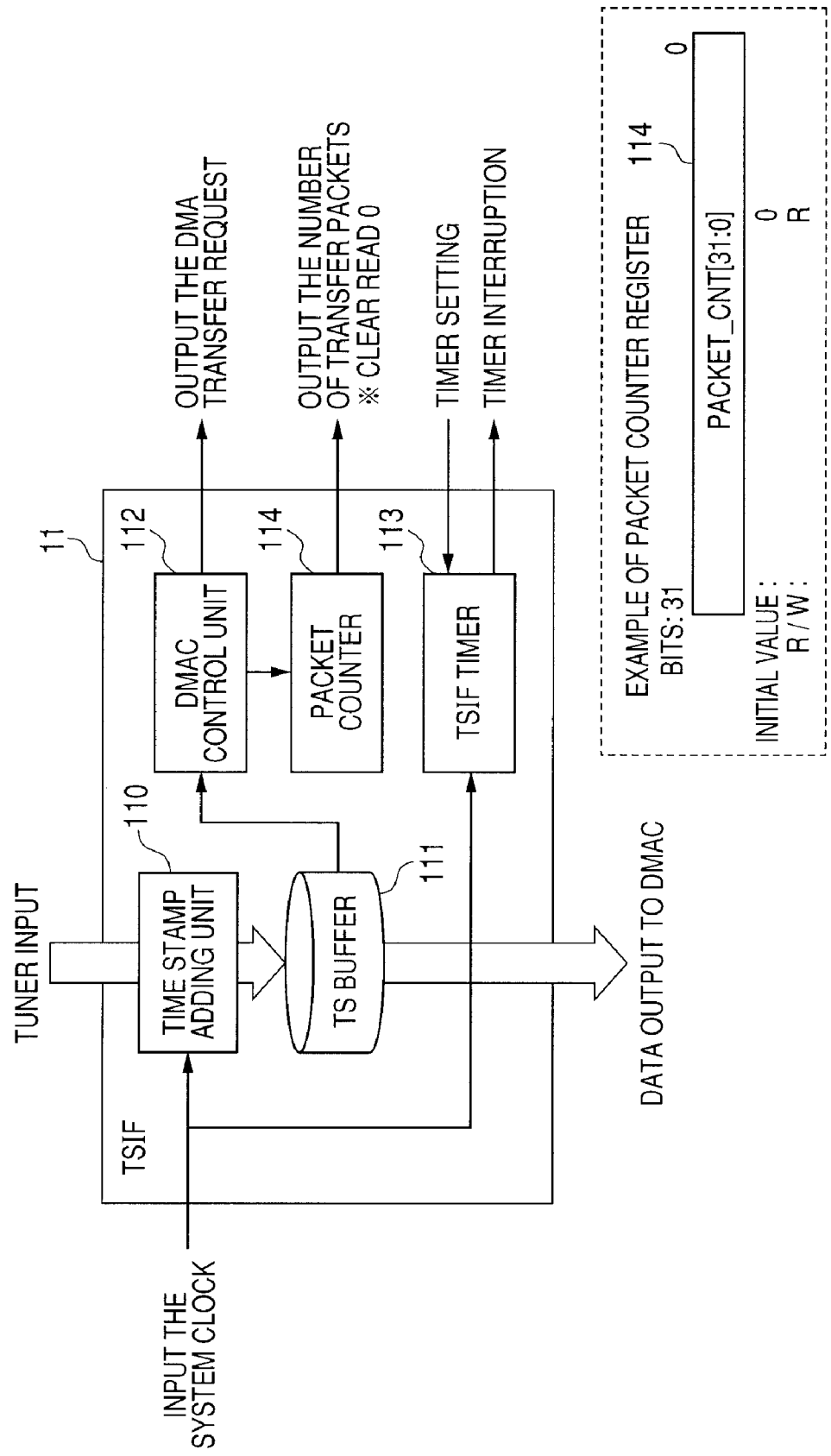
FIG. 14 is a diagram showing the configuration of the TSIF 11 included in the application processor 1 illustrated in FIG. 15.

After obtaining the number of transfer packets from the packet counter (114) by the process unit (13, 18), the value of the packet counter (114) is reset to zero (refer to FIG. 14).

After restart of reception after the reception interruption, the packet counter (114) stores the number of transfer restart packets which are restarted to be transferred to the external memory (7) by the data transfer unit (12) (refer to FIGS. 17A and 17B).

Figure 18B:
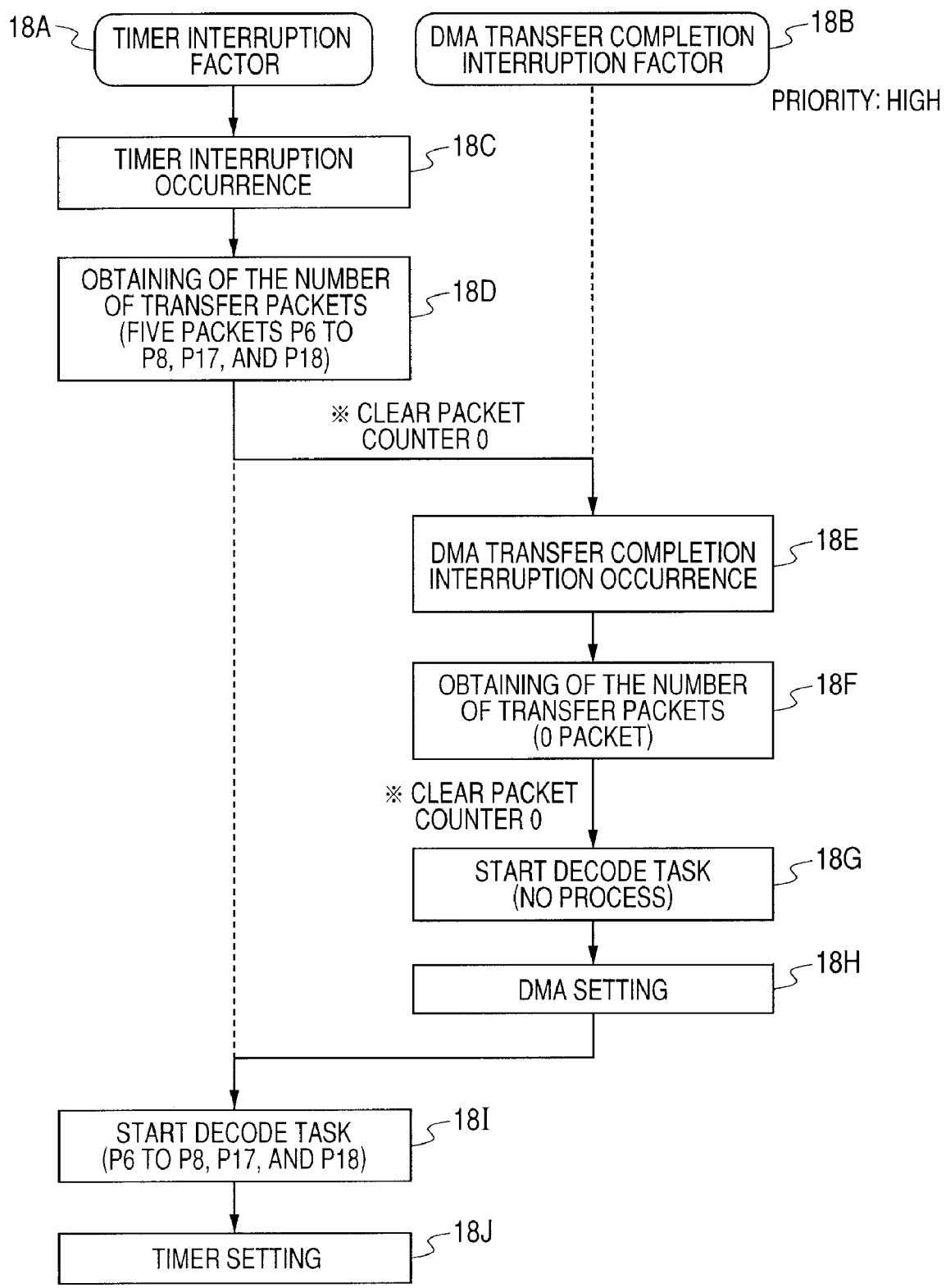

The process unit obtains (18D) the number of transfer packets of the reception packet data stored in the external memory (7) before the reception interruption from the packet counter (114) in response to the occurrence (18C) of the timer interruption and, after that, the data transfer completion interruption occurs (18E) (refer to FIGS. 18A and 18B).

According to the number of transfer packets obtained from the packet counter by the process unit in response to the occurrence of the timer interruption, either the process (18I in FIG. 18A) responding to the occurrence (18C) of the timer interruption of the reception packet data stored in the external memory (7) or the process (18G in FIG. 18B) responding to the occurrence (18E) of the data transfer completion interruption of the plurality of pieces of reception packet data stored in the external memory (7) is omitted.

According to the embodiment, the semiconductor integrated circuit with reduced burden at the time of solving a conflict in the overlapping process in process for a plurality of interruption factors can be provided.

In a preferred embodiment, in the case where the number of transfer packets obtained from the packet counter by the process unit in response to the occurrence of the timer interruption is smaller than the predetermined number of packets, execution of the process (18I) responding to the occurrence (18C) of the timer interruption of the reception packet data stored in the external memory (7) before the reception interruption is omitted. On the other hand, the process (18G) responding to the occurrence (18E) of the data transfer completion interruption of the plurality of pieces of reception packet data stored in the external memory (7) is executed (refer to FIG. 18A).

In the case where the number of transfer packets obtained from the packet counter by the process unit in response to the occurrence of the timer interruption is equal to the predetermined number of packets, the process (18I) responding to the occurrence (18C) of the timer interruption of the reception packet data stored in the external memory (7) before the reception interruption and after the reception restart is executed and, on the other hand, execution of the process (18G) responding to the occurrence (18E) of the data transfer completion interruption of the plurality of pieces of reception packet data stored in the external memory (7) is omitted (refer to FIG. 18B).

In another preferred embodiment, the process unit includes a central processing unit (CPU), and the data transfer unit (12) is a direct memory access controller (DMAC) (refer to FIG. 15).

In further another preferred embodiment, the reception interface (11) can receive a plurality of pieces of reception packet data as a form of a transport stream of MPEG (refer to FIG. 15).

In a more preferred embodiment, the central processing unit (CPU) of the process unit demultiplexes the plurality of pieces of reception packet data stored in the external memory (7) in the form of the transport stream of MPEG to video and sound elementary streams by a demultiplexing process.

In a concrete embodiment, the process unit further includes an MPEG decoder (18), a display control apparatus (14), and a sound output control unit (19).

The video and sound elementary streams separated by the central processing unit (CPU) are decoded by the MPEG decoder (18) to a video reproduction signal and a sound reproduction signal.

Output synchronization of the video reproduction signals is executed by the display control apparatus (14), and output synchronization of the sound reproduction signals is executed by the sound output control unit (19).

In more concrete embodiment, priority of the data transfer completion interruption is set to be higher than that of the timer interruption.

2. A representative embodiment from another aspect of the present invention relates to a semiconductor integrated circuit (1) having an input interface (11), a first process unit (12), and a second process unit (13, 18).

The input interface (11) includes a buffer (111) capable of sequentially storing a plurality of pieces of input packet data (P1, P2, P3, . . . ), and a timer (113) performing counting operation.

The first process unit (12) can process the plurality of pieces of input packet data stored in the buffer (111), the second process unit (13, 18) can process a process result of the first process unit (12) (refer to FIG. 15).

When the first process unit (12) reads the plurality of pieces of input packet data of predetermined number of packets from the buffer and completes a first process on the read data, the first process unit (12) can notify the second process unit (13, 18) of a first process completion interruption.

The second process unit (13, 18) can start a second process on the process result of the first process unit (12) in response to occurrence of the first process completion interruption from the first process unit (12).

During input interruption of the plurality of pieces of input packet data to the input interface (11), the timer (113) executes the counting operation.

In the case where the first process on the plurality of pieces of input packet data of the predetermined number of packets is not completed within predetermined count time by the counting operation during the input interruption, the timer (113) can notify the second process unit (13, 18) of a timer interruption.

In response to occurrence of the timer interruption from the timer (113), the second process unit (13, 18) can start the second process on the data processed by the first process unit (12) before the input interruption (refer to FIGS. 17A and 17B).

The input interface (11) further includes a packet counter (114) that stores the number of packets of the data processed by the first process unit (12).

Before the second process unit (13, 18) starts the second process in response to the occurrence of the first process completion interruption, the second process unit (13, 18) can obtain the number of processed packets from the packet counter (114).

In response to the occurrence of the timer interruption, the second process unit (13, 18) can obtain the number of packets of the data processed by the first process unit (12) before the input interruption from the packet counter (114).

After obtaining the number of transfer packets from the packet counter (114) by the second process unit (13, 18), the value of the packet counter (114) is reset to zero (refer to FIG. 14).

After input restart subsequent to the input interruption, the packet counter (114) stores the number of input restart packets of restart input packet data which is restarted to be input.

In response to the occurrence (18C) of the timer interruption, the second process unit obtains (18D) the number of packets of the input packet data which is input before the input interruption from the packet counter (114), after that, the occurrence (18E) of the first process completion interruption occurs (refer to FIGS. 18A and 18B).

According to the number of processed packets obtained from the packet counter by the second process unit in response to the occurrence of the timer interruption, execution of either a process (18I in FIG. 18A) responding to the occurrence (18C) of the timer interruption by the second process unit (13, 18) on the data processed by the first process unit (12), or the second process (18G in FIG. 18B) responding to the occurrence (18E) of the first process completion interruption by the second process unit (13, 18) on the data processed by the first process unit (12) is omitted.

According to the embodiment, the semiconductor integrated circuit with reduced burden at the time of solving a conflict in the overlapping process in process for a plurality of interruption factors can be provided.

In a preferred embodiment, in the case where the number of transfer packets obtained from the packet counter by the second process unit in response to the occurrence of the timer interruption is smaller than the predetermined number of packets, execution of the process (18I) responding to the occurrence (18C) of the timer interruption by the second process unit (13, 18) on the data processed by the first process unit (12) before the input interruption is omitted. On the other hand, the second process (18G) responding to the occurrence (18E) of the first process completion interruption by the second unit (13, 18) on the data processed by the first process unit (12) is executed (refer to FIG. 18A).

In the case where the number of transfer packets obtained from the packet counter by the second process unit in response to the occurrence of the timer interruption is equal to the predetermined number of packets, the process (18I) responding to the occurrence (18C) of the timer interruption by the second process unit (13, 18) on the data processed by the first process unit (12) before the input interruption and after the input restart is executed and, on the other hand, execution of the second process (18G) responding to the occurrence (18E) of the first process completion interruption by the second process unit (13, 18) on the data processed by the first process unit (12) is omitted (refer to FIG. 18B).

In another preferred embodiment, the second process unit (13, 18) includes a central processing unit (CPU), and the first process unit (12) includes another process unit (DMAC) (refer to FIG. 15).

In further another preferred embodiment, priority of the first process completion interrupt is set to be higher than that of the timer interruption.

2. Details of Embodiments

Next, the embodiments will be described more specifically.

In all of drawings for explaining best modes for carrying the present invention, the same reference numerals are designated to parts having the same functions as in the drawings described, and their description will not be repeated.

First Embodiment

Configuration of Application Processor

FIG. 15 is a block diagram showing the configuration of an application processor according to a first embodiment of the invention.

The application processor 1 shown in FIG. 15 includes, in a manner similar to FIG. 1, the TSIF 11, the DMAC 12, the CPU 13, the LCD control unit 14, the data bus 15, the memory interface 17, the MPEG decoder 18, and the sound output control unit 19.

In a manner similar to FIG. 1, in FIG. 15, a next-generation one-segment broadcasting of ISDB-Tmm is received by the digital television antenna 2 mounted on a cellular phone terminal, and packet data of MPEG2-TS is supplied from the output terminal of the external digital television tuner 3 to the input terminal of the TSIF 11 of the application processor 1. A system clock signal as a reference clock is supplied from the external system clock generator 4 to the TSIF 11. Further, the packet data of MPEG2-TS supplied to the TSIF 11 is transferred to the external memory 7 via the data bus 15 and the memory interface 17 by DMA transfer executed by the built-in DMAC 12. A high-speed large-capacity synchronous DRAM can be used as the external memory 7.

Since the operations of the components 11 to 15 and 17 to 19 included in the application processor 1 shown in FIG. 15 are the same as those included in the application processor 1 shown in FIG. 1, the description will not be repeated.

In the application processor 1 shown in FIG. 15, however, the timer 16 included in the application processor 1 shown in FIG. 1 is omitted. Instead, the function equivalent to the timer 16 in FIG. 1 which is omitted in FIG. 15 is realized by the TSIF 11 included in the application processor 1 shown in FIG. 15.

Configuration of TSIF

FIG. 14 is a diagram showing the configuration of the TSIF 11 included in the application processor 1 shown in FIG. 15.

The TSIF 11 shown in FIG. 14 is configured by, like the TSIF 11 shown in FIG. 2, the time stamp adding unit 110, the TS (Transport Stream) buffer 111, and the DMAC control unit 112 and, in addition, a TSIF timer 113 and a packet counter 114.

Since the configuration and operation of the time stamp adding unit 110, the TS buffer 111, and the DMAC control unit 112 in the TSIF 11 shown in FIG. 14 are similar to those of the TSIF 11 shown in FIG. 2, the description will not be repeated.

The TSIF timer 113 has the function of generating a timer interruption to the CPU 13 in place of the timer 16 in FIG. 1. The resource of the timer 113 uses a system clock signal supplied from the system clock generator 4 used for adding a time stamp. Although the system clock is used in the example, another clock signal may be also used. Further, a clock generator on the outside of the TSIF timer 113 can be also used. Like the timer 16, the TSIF timer 113 is configured by a counter. The TSIF timer 113 executes counting operation by being subjected to the timer setting (5) by the DMAC timer control unit 133. In the case where DMAC transfer by the DMAC 12 of predetermined number of packets of MPEG2-TS has not been completed within predetermined count time by the counting operation, the TSIF timer 113 executes the timer interruption (7) in the DMAC timer control unit 133 in the CPU 13. In response to the timer interruption (7), the CPU 13 starts the decoding process (4) including the early transport stream (TS) analysis and the data process on DMA-transferred packets in the external memory 7.

The packet counter 114 has the function of counting the number of transfer packets of 192 bytes which have been DMA-transferred by the DMAC 12 has. As shown in a right lower part in FIG. 14, for example, a count value PACKET_CNT of the packet counter 114 is made of 32 bits. The initial value of the count value PACKET_CNT is zero and is incremented each time DMA transfer of packets of 192 bytes is performed by the DMAC 12. When the CPU 13 reads the count value PACKET_CNT by reading operation R of the packet counter 114, the count value PACKET_CNT is reset to zero.

Control in the Case of Strong Electric Field

FIG. 16 is a diagram showing control on the flow of the MPEG2-TS in the case of the strong electric field, which is finely observed in the units in the application processor 1 illustrated in FIG. 15 including the TSIF 11 shown in FIG. 14.

Figure 10A:
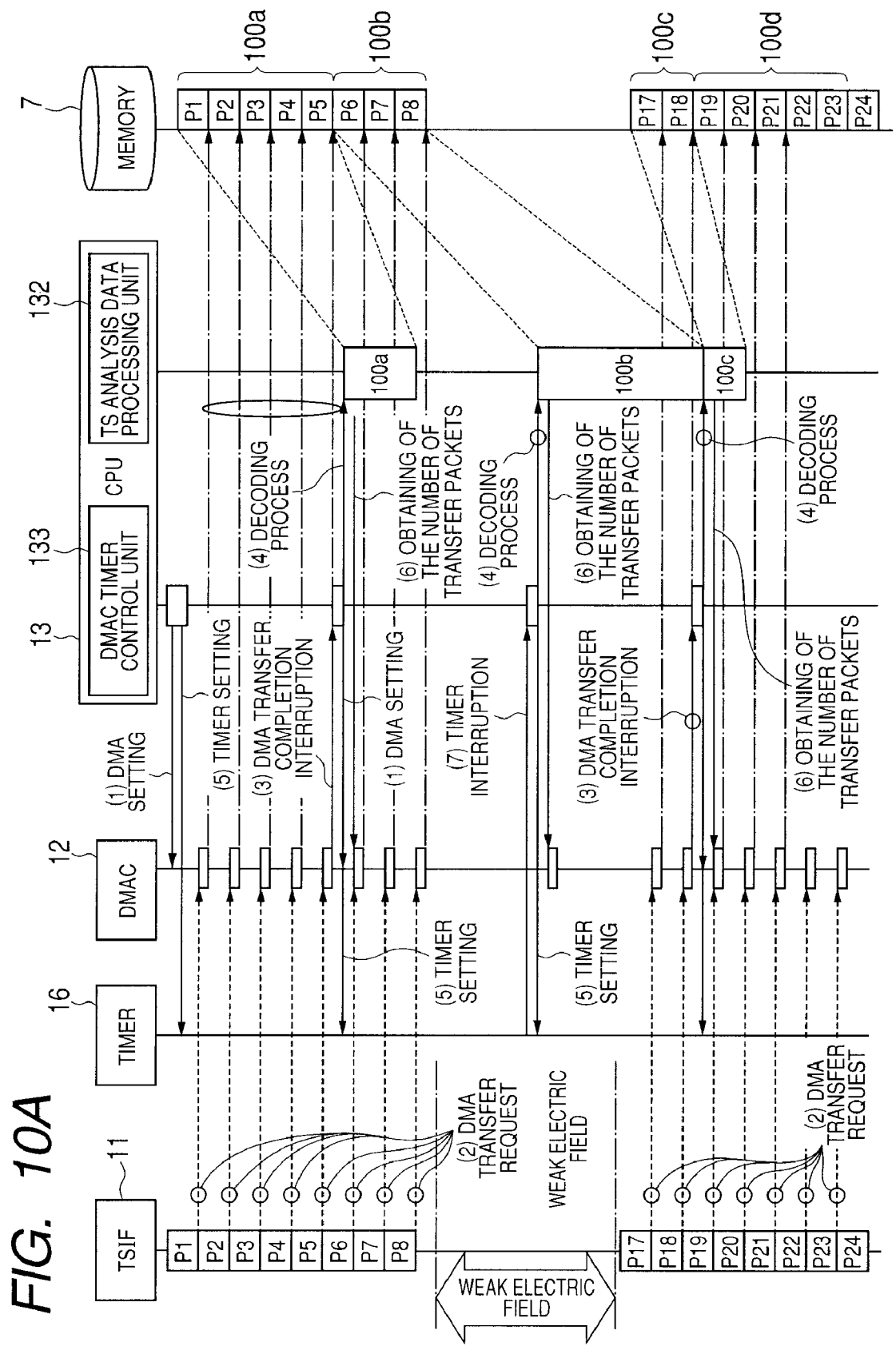

In FIG. 16, different from FIGS. 10A and 10B, the DMA timer control unit 133 in the CPU 13 does not execute the timer setting (5) in the timer 16 but executes the timer setting (5) in the TSIF timer 113 included in the TSIF 11 in FIG. 14.

In FIG. 16, the number of transfer packets which have been DMA-transferred by the DMA 12 can be stored in the packet counter 114 in the TSIF 11 shown in FIG. 14. That is, each time execution of the DMA transfer from the TS buffer 111 in the TSIF 11 to the external memory 7 by the DMAC 12 of one packet of 192 bytes of MPEG2-TS completes, the number of transfer packets stored in the packet counter 114 is increased by one. In such a manner, during the DMA transfer of a plurality of packets, the number of transfer packets stored in the packet counter 114 is updated.

In response to the DMA transfer completion interruption (3) or the timer interruption (7), the TS analysis data processing unit 132 in the CPU 13 obtains the number of transfer packets (6) and recognizes the number of packets included in the reception packet data which has been DMAC transferred to the external memory 7. In the obtaining (6) of the number of transfer packets, the TS analysis data processing unit 132 in the CPU 13 reads an update value of the packet counter 114 in the TSIF 11 and obtains the number of packets to be subjected to the decoding process (4) later. When reading of the update value of the packet counter 114 of the TSIF 11 by the CPU 13 is completed, the value PACKET_CNT of the packet counter 114 is reset to zero.

Figure 8:
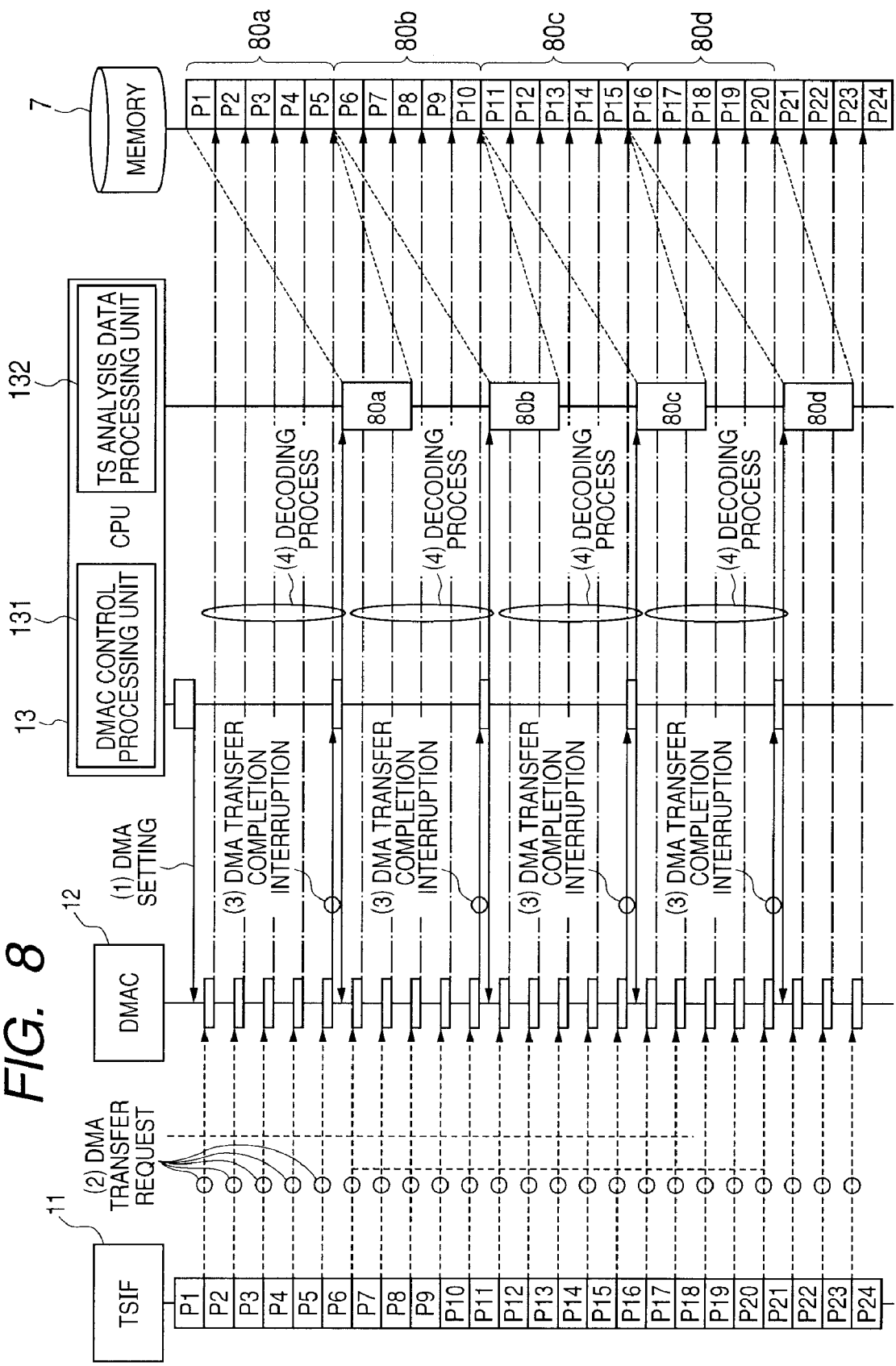
FIG. 8 is a diagram showing control on the flow of the MPEG2-TS in the case of strong electric field, which is finely observed at the points in the application processor 1 illustrated in FIG. 1 by employing the method of notifying of an interruption every plural packets in order to solve a problem such that the interruption interval becomes shorter at the time of receiving a next-generation one-segment broadcasting.

Also in FIG. 16, like in FIG. 8, first, the SMA timer control unit 133 in the CPU 13 executes the DMA setting (1) in the DMAC 12. In the DMA setting (1), the DMA transfer data size of, for example, five packets (192 bytes×5) is designated. Then, the DMAC 12 waits for a DMAC transfer request from the DMAC control unit 112 in the TSIF 11.

On completion of reception of the first packet P1 of MPEG2-TS to the TS buffer 111 in the TSIF 11, the DMAC control unit 112 in the TSIF 11 outputs the DMA transfer request (2) to the DMAC 12. In response to the DMA transfer request (2) which is output on completion of reception of the first packet P1 to the TS buffer 111 in the TSIF 11, the DMA timer control unit 133 in the CPU 13 starts the counting operation of the TSIF timer 113 included in the TSIF 11. Further, the DMAC 12 reads the first packet P1 temporarily stored in the TS buffer 111 in the TSIF 11 in response to the DMA transfer request (2) and executes DMA transfer to the external memory 7. Similarly, on completion of reception of each of the second packet P2, the third packet P3, the fourth packet P4, and the fifth packet P5 of the MPEG2-TS to the TS buffer 111 in the TSIF 11, the DMAC control unit 112 in the TSIF 11 outputs the DMA transfer request (2) to the DMAC 12. Further, in response to each DMA transfer request (2), the DMAC 12 reads data from the second packet P2 to the fifth packet P5 temporarily stored in the TS buffer 111 in the TSIF 11, and executes the DMA transfer to the external memory 7.

When the DMA transfer from the TSIF 11 to the external memory 7 of data 160a from the first packet P1 to the fifth packet P5 is completed as described above, the DMAC 12 notifies the DMA timer control unit 133 in the CPU 13 of a DMA transfer completion interruption of the data 160a in the 5-packet unit (3). In response to the DMA transfer completion interruption every five packets, the TS analysis data processing unit 132 in the CPU 13 executes the decoding process (4) including the transport stream analysis and the data process on the data 160a in the 5-packet unit. Prior to start of the decoding process (4), the TS analysis data processing unit 132 in the CPU 13 performs the obtaining (6) of the number of transfer packets by reading the packet counter 114 in the TSIF 11 and recognizes the number of the packets P1 to P5 included in the first reception packet data 160a which has been DMA-transferred to the external memory 7. Further, the DMA transfer completion interruption of the data in the 5-packet unit and the decoding process (4) including the TS analysis and data process on the data in the 5-packet unit are repeated also on data 160b and 160c of the subsequent packets P6 to P10 and P11 to P15 in the 5-packet unit in the MPEG2-TS.

Control in the Case of Weak Electric Field

FIGS. 17A and 17B are diagrams showing control on the flow of the MPEG2-TS in the case where the strong electric field changes to the weak electric field, which is finely observed in the units in the application processor 1 in the first embodiment of the invention illustrated in FIG. 15 when the DMA transfer completion interruption of every plural packets and the timer interruption are employed.

FIG. 17A is a diagram for explaining processes in the case where the time difference between the timer interruption (7) and the DMA transfer completion interruption (3) is relatively large and the decoding process by the timer interruption is disrupted.

FIG. 17B is a diagram explaining processes performed when the time difference between the timer interruption (7) and the DMA transfer completion interruption (3) is relatively small.

In FIG. 17A showing the case where the time difference between the timer interruption (7) and the DMA transfer completion interruption (3) is relatively large and the decoding process by the timer interruption is disrupted, the value of the packet counter 114 of the TSIF 11 is shown just below the TSIF 11. The value of the packet counter 114 is incremented by an amount of one packet each time execution of the DMA transfer from the TS buffer 111 to the external memory 7 by the DMAC 12 of one packet of 192 bytes of MPEG2-TS responding to the DMA transfer request (2) is completed. The value of the packet counter 114 is reset to zero when the TS analysis data processing unit 132 in the CPU 13 reads an updated value of the packet counter 114 in the TSIF 11 in response to the obtaining of the number of transfer packets (6).

Figure 9:
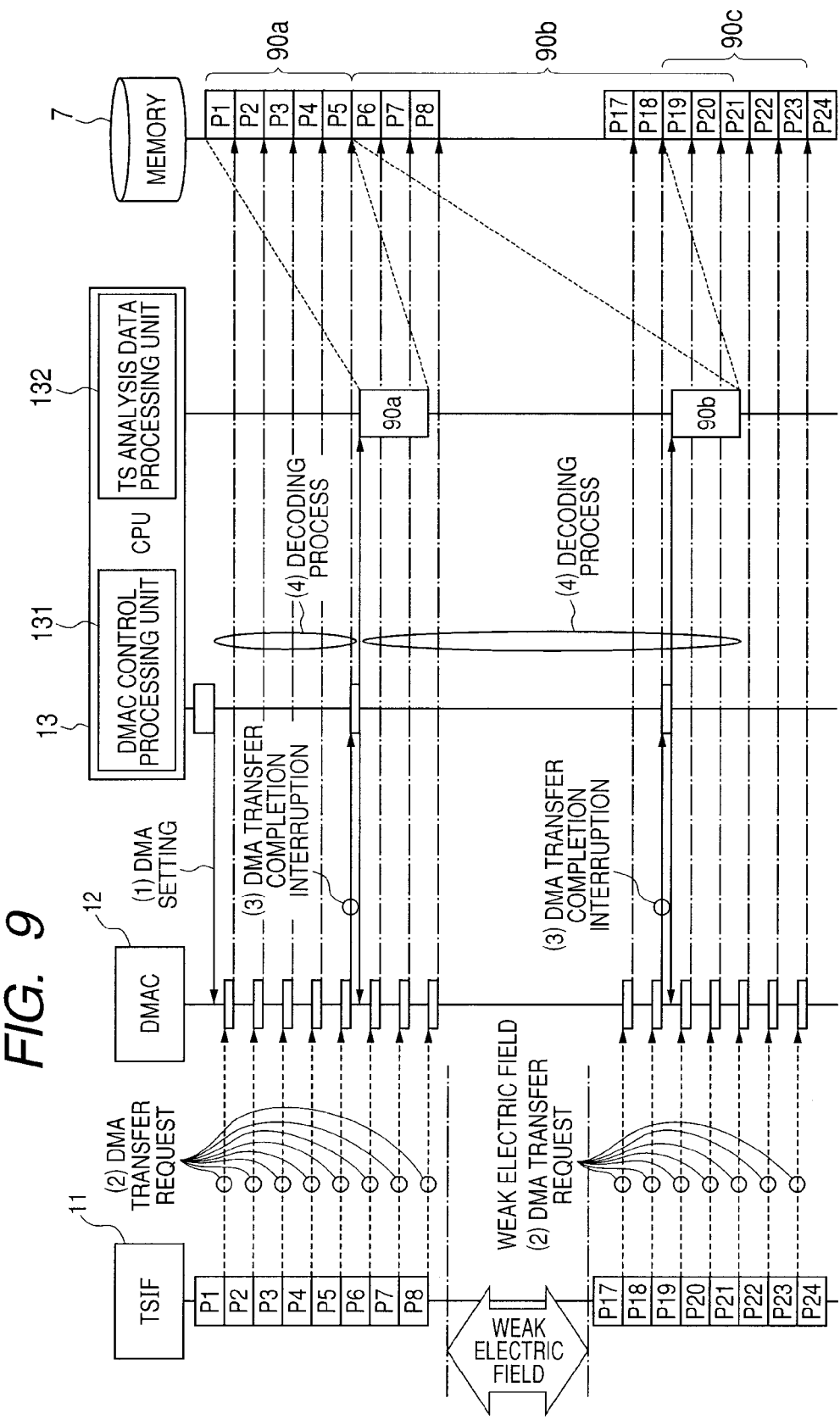
FIG. 9 is a diagram showing control on the flow of the MPEG2-TS in the case where the strong electric field changes to the weak electric field, which is finely observed in the units in the application processor 1 illustrated in FIG. 1 when the method of notifying of an interruption every plural packets shown in FIG. 8 is employed.

Also in FIG. 17A, like in FIGS. 9, 10, and 16, with respect to data 170*a* of the packets P1 to P5 in the first 5-packet unit, reception in the TSIF 11, the DMA transfer from the TSIF 11 to the external memory 7 by the DMAC 12, and the decoding process (4) including the TS analysis and the data process by the CPU 13 are executed. The operations in FIG. 17A are the same as those in FIGS. 9, 10, and 16, so that detailed description will not be repeated.

Also in FIG. 17A, like in FIGS. 9 and 10, with respect to three packets P6 to P8 in the second 5-packet unit data 170*b*, reception in the TSIF 11 and the DMA transfer from the TSIF 11 to the external memory 7 by the DMAC 12 are executed, after that, the strong electric field changes to the weak electric field, and the device enters a reception interruption state that the MPEG2-TS of the packets P9 to P16 included in the data 170*b* cannot be received by the TSIF 11.

Further, also in FIG. 17A, like in FIGS. 9 and 10, when the weak electric field becomes again the strong electric field, two packets P17 and P18 in the third reception packet data 170*c* are received by the TSIF 11.

Figure 12A:
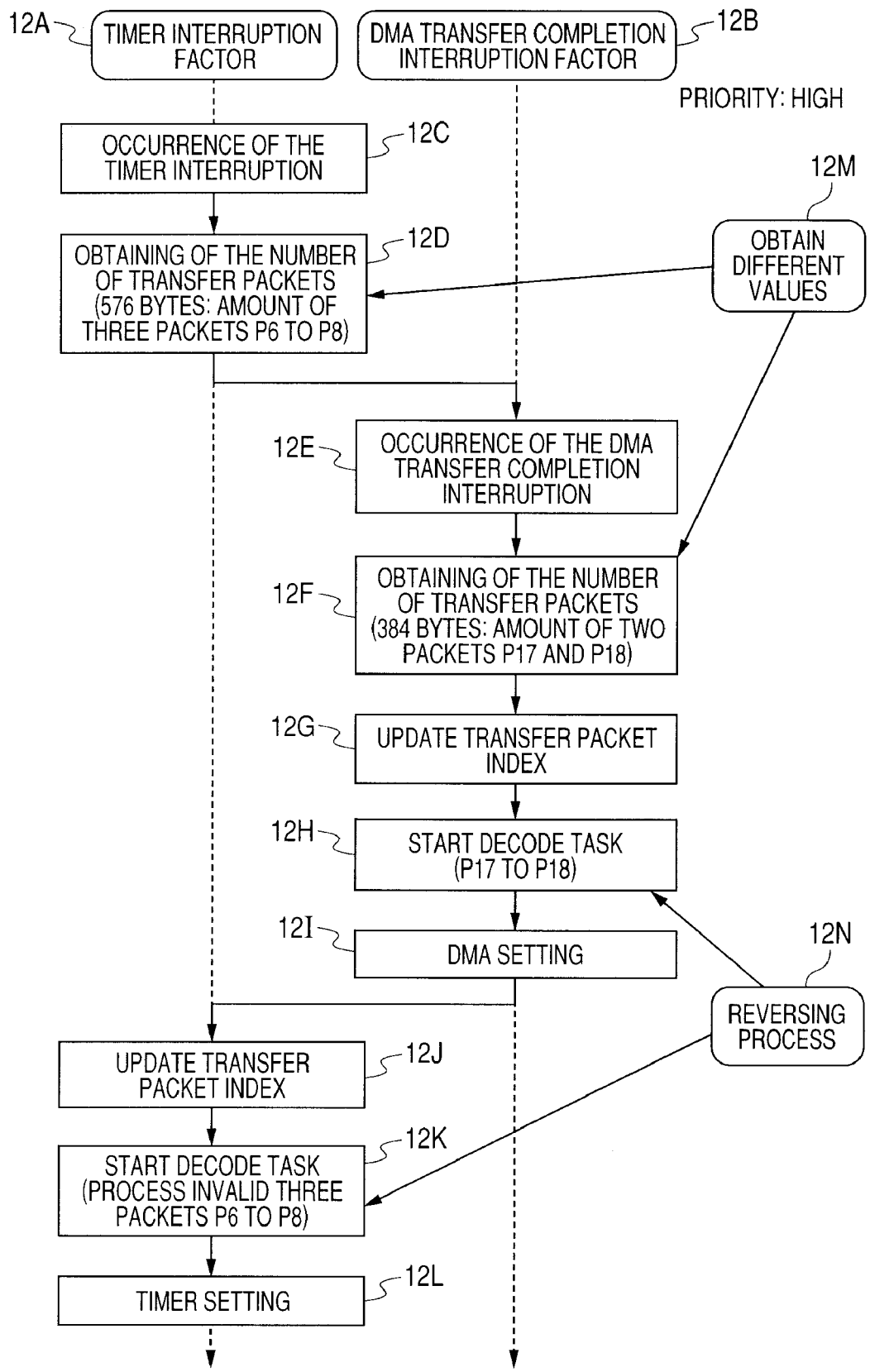
FIGS. 12A and 12B are diagrams illustrating processes performed in the case where the timer interruption having low priority occurs before the DMA transfer completion interruption when the priority of the DMA transfer completion interruption is set to be higher than that of the timer interruption in the process of FIGS. 10A and 10B.
Figure 12B:
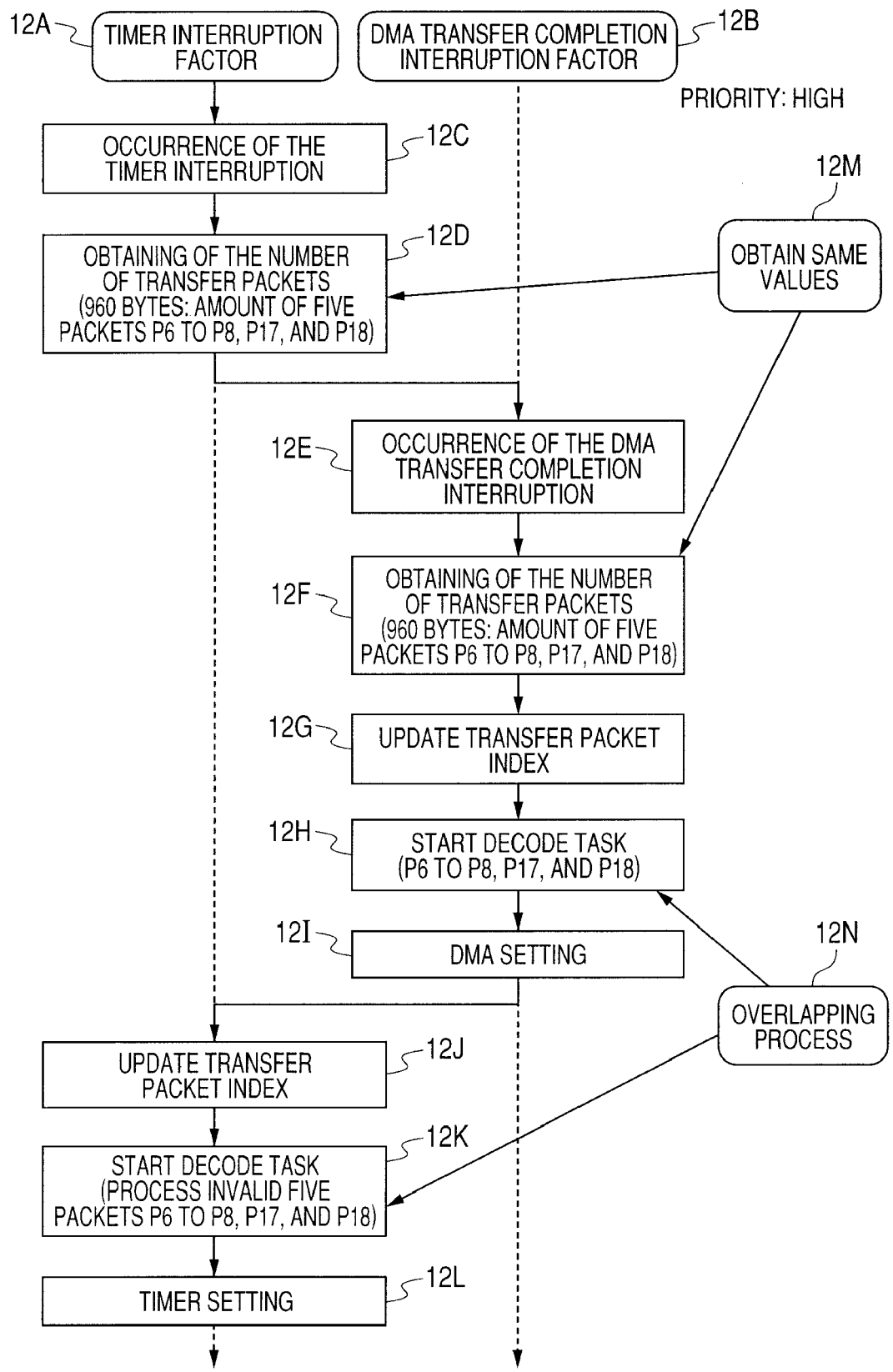

In the process of FIGS. 10A and 10B, as shown in the process of FIGS. 12A and 12B, when the timer interruption 12C having low priority by the timer 16 occurs before the DMAC transfer completion interruption 12E (3) having high priority by the DMAC 12 after the weak electric field becomes again the strong electric field during the reception interruption state due to the weak electric field, an erroneous operation occurs.

That is, in the process of FIGS. 10A and 10B, as shown in the process of FIGS. 12A and 12B, an erroneous operation occurs due to the overlapping process 12M of the former decoding process 12H (4) responding to the latter DMAC transfer completion interruption 12E (3) having high priority and the latter decoding process 12K responding to the former timer interruption 12C having low priority. The former decoding process 12H responding to the latter DMAC transfer completion interruption 12E (3) having high priority is the decoding process (4) of two packets P17 and P18 of the third reception packet data 100*c* received after restart of reception. The latter decoding process 12K responding to the former timer interruption 12C having low priority is the decoding process 12K (4) of three packets P6 to P8 included in the second reception packet data 100*b* received before the reception interruption state due to the weak electric field.

However, in the process of FIG. 17A, after obtaining (6) of the number of transfer packets of the TS analysis data processing unit 132 in the CPU 13 responding to the timer interruption (7) having low priority by the timer 113 in the reception interruption state due to the weak electric field, in a state where the decoding process is disrupted for some reason, the weak electric field becomes again the strong electric field. After that, the DMAC transfer completion interruption (3) having high priority by the DMAC 12 occurs. In such a case, the decoding process (4) on the three packets P6 to P8 of total 576 bytes of the second reception packet data 170*b* before the reception interruption state responding to obtaining of the number of transfer packets (6) due to the timer interruption (7) having low priority is not executed but held due to the DMAC transfer completion interruption having high priority (3). However, in the case where the DMA transfer completion interruption (3) having high priority does not occur within predetermined lapse time after the obtaining (6) of the number of transfer packets of the CPU 13 responding to the timer interruption (7) having low priority during the reception interruption state due to the weak electric field, the decoding process (4) on the three packets P6 to P8 of total 576 bytes of the second reception packet data 170*b* before the reception interruption state in which the decoding process is held is executed after lapse of predetermined lapse time. The fact that the DMAC transfer completion interruption (3) having high priority does not occur within predetermined lapse time after obtaining (6) of the number of transfer packets of the CPU 13 responding to the timer interruption (7) having low priority during the reception interruption state due to the weak electric field can be detected by the timer disposed in the DMAC timer control unit 133 in the CPU 13.

Further, in response to the DMAC transfer completion interruption (3) having high priority by the DMAC 12 returned to the strong electric field, the TS analysis data processing unit 132 of the CPU 13 executes the obtaining (6) of the number of transfer packets from the packet counter 114 in the TSIF 11. By this time, the DMAC transfer by the DMAC 12 on the two packets P17 and P18 of total 384 bytes in the third reception packet data 170*c* after restart of reception has been completed. Therefore, the decoding process (4) is performed on the two packets P17 and P18 of total 384 bytes in the third reception packet data 170*c* after restart of reception responding to the obtaining (6) of the number of transfer packets due to the latter DMAC transfer completion interruption having high priority. At the time of executing the decoding process (4) in response to the obtaining (6) of the number of transfer packets on the two packets P17 and P18 in the third reception packet data 170*c* after restart of reception, the information of the obtaining (6) of the number of transfer packets on the three packets P6 to P8 in the second reception packet data 170*b* before the reception interruption state and information for the decoding process (4) are discarded.

In such a manner, in the process of FIG. 17A, reverse order between the former decoding process (4) responding to the latter DMAC transfer completion interruption (3) having high priority and the latter decoding process (4) responding to the former timer interruption (7) having low priority occurring in the process of FIGS. 10A and 10B and the erroneous operation can be avoided.

Also in FIG. 17B showing the case where the time difference between the timer interruption (7) and the DMA transfer completion interruption (3) is relatively small, the value of the packet counter 114 of the TSIF 11 is shown just below the TSIF 11. Also in FIG. 17B, like in FIG. 17A, reception interruption due to a change from the strong electric field to the weak electric field and reception restart due to a change from the weak electric field to the strong electric field occur. However, in FIG. 17B, the timing of occurrence of the timer interruption (7) having low priority by the timer 113 due to the reception interruption state by the weak electric field delays even after the reception restart due to a change from the weak electric field to the strong electric field. Therefore, in response to the obtaining (6) of the former timer interruption (7) having low priority, the values of total five packets of the three packets P6 to P8 in the second reception packet data 170*b* received before the reception interruption state and the two packets P17 and P18 in the third reception packet data 170*c* after the reception restart are read as the value of the packet counter 114 of the TSIF 11 by the TS analysis data processing unit 132 of the CPU 13. In such a manner, the decoding process (4) is executed on the total five packets of the three packets P6 to P8 in the second reception packet data 170*b* received before the reception interruption state and the two packets P17 and P18 in the third reception packet data 170*c* after the reception restart.

In such a manner, in the process of FIG. 17B, the overlapping between the former decoding process (4) responding to the latter DMAC transfer completion interruption (3) having high priority and the latter decoding process (4) responding to the former timer interruption (7) having low priority occurring in the process of FIGS. 10A and 10B and the erroneous operation can be avoided.

Process of Avoiding Overlapping

FIGS. 18A and 18B are diagrams showing process for avoiding the reverse order or overlapping between the former decoding process responding to the latter DMA transfer completion interruption (3) having high priority and the latter decoding process responding to the former timer interruption (7) having low priority in the process of FIGS. 17A and 17B.

FIG. 18A is a diagram for explaining the process performed in the case where the time difference between occurrence 18C of the timer interruption having low priority and occurrence 18E of the DMA transfer completion interruption having high priority is relatively large and the decoding process due to the timer interruption is disrupted. FIG. 18B is a diagram explaining the process performed when the time difference between the occurrence 18C of the timer interruption having low priority and the occurrence 18E of the DMA transfer completion interruption having high priority is relatively small.

Also in FIG. 18A showing the case where the time difference is relatively large and the decoding process by the timer interruption is disrupted, like in FIG. 12A, a timer interruption factor 18A and a DMA transfer completion interruption factor 18B exist as a plurality of interruption factors. The occurrence 18C of the timer interruption having low priority is before the occurrence 18E of the DMAC transfer completion interruption (3) having high priority. However, after obtaining 18D of the number of transfer packets (6) on the three packets P6 to P8 of total 576 bytes in the second reception packet data 170b before the reception interruption state responding to the former occurrence 18C of the timer interruption (7) having low priority, the decoding process is disrupted by the timer interruption. After a while, the latter occurrence 18E of the DMA transfer completion interruption (3) having high priority follows. Therefore, the decoding process (4) on the three packets P6 to P8 of the second reception packet data 170b before the reception interruption state responding to the obtaining 18D of the number of transfer packets (6) by occurrence 18C of the timer interruption (7) having low priority is held without being executed. The value of the packet counter 114 of the TSIF 11 is reset to zero in response to the obtaining 18D of the number of transfer packets (6) responding to the occurrence 18C of the timer interruption (7) having low priority. However, in the case where the DMAC transfer completion interruption (3) having high priority does not occur (18E) within predetermined lapse time after obtaining 18D of the number of transfer packets (6) of the CPU 13 responding to the occurrence 18C of the timer interruption (7) having low priority during the reception interruption state due to the weak electric field, the held decoding process (4) on the three packets P6 to P8 of total 576 bytes of the second reception packet data 170b before the reception interruption state is executed in step 18I after lapse of the predetermined lapse time. As described above, a timer disposed in the DMAC timer control unit 133 in the CPU 13 can detect that the DMAC transfer completion interruption (3) having high priority does not occur within the predetermined lapse time after the obtaining 18D of the number of transfer packets (6) of the CPU 13 responding to the occurrence 18C of the timer interruption (7) having low priority during the reception interruption state due to the weak electric field.

After that, by the obtaining 18F of the number of transfer packets (6) responding to the latter occurrence 18E of the DMA transfer completion interruption (3) having high priority, the number of transfer packets on the two packets P17 and P18 in the third reception packet data 170c after restart of reception is obtained. As a result, in the following step 18G of the decoding process (4), the decoding process (4) on the two packets P17 to P18 of the third reception packet data 170c after restart of reception responding to the obtaining 18F of the number of transfer packets (6) by the latter occurrence 18E of the DMA transfer completion interruption having high priority can be executed. The value of the packet counter 114 of the TSIF 11 is reset to zero by the obtaining 18F of the number of transfer packets (6) due to the latter occurrence 18E of the DMA transfer completion interruption (3) having high priority. At the time of executing the decoding process 18G (4), the information of the obtaining (6) of the number of transfer packets on the three packets P6 to P8 of total 576 bytes in the second reception packet data 170b before the reception interruption state and information for the decoding process (4) are discarded.

In the following step 18H, the DMAC timer control unit 133 of the CPU 13 executes the DMA setting (1). After that, the program is returned to the process in the step 18I of the decoding process (4) with respect to the timer interruption having low priority. However, by the obtaining 18D of the number of transfer packets (6), the value of the packet counter 114 of the TSIF 11 related to the former occurrence 18 of the timer interruption (7) having low priority is reset to zero, and the information of the obtaining (6) of the number of transfer packets on the three packets P6 to P8 of total 576 bytes in the second reception packet data 170b before the reception interruption state and information for the decoding process (4) are discarded, so that actual decoding process is not executed in the decoding process (4) in step 18I. In the following step 18J, the DMAC timer control unit 133 in the CPU 13 executes the timer setting (5).

Also in FIG. 18B of the case where the time difference is relatively small, like in FIG. 18A of the case where the time difference is relatively large, the timer interruption factor 18A and the DMA transfer completion interruption factor 18B exist as a plurality of interruption factors. The timer interruption (7) having low priority occurs (18C) before the occurrence 18E of the DMA transfer completion interruption (3) having high priority. However, immediately after obtaining 18D of the number of transfer packets (6) on total five packets P6 to P8, P17, and P18 in the second reception packet data 170b before the reception interruption state responding to the former occurrence 18C of the timer interruption (7) having low priority and the reception packet data 170c by the reception restart after the reception interruption, there is the latter occurrence 18E of the DMA transfer completion interruption (3) having high priority. As a result, by the latter occurrence 18E of the DMA transfer completion interruption (3) having high priority, the decoding process (4) on the total five packets P6 to P8, P17, and P18 responding to the obtaining 18D of the number of transfer packets (6) due to the former occurrence 18C of the timer interruption (7) having low priority is not executed but is temporarily held. By the obtaining 18D of the number of transfer packets (6) responding to the former occurrence 18C of timer interruption (7) having low priority, the value of the packet counter 114 of the TSIF 11 is reset to zero.

After that, the process shifts from the process responding to the former occurrence 18C of the timer interruption (7) having low priority to the process responding to the latter occurrence 18E of the DMA transfer completion interruption (3) having high priority. As a result, by the obtaining 18F of the number of transfer packets (6) responding to the latter occurrence 18E of the DMA transfer completion interruption (3) having high priority, zero as a reset value is read from the packet counter 114. Therefore, a substantial decoding process is not executed in the step 18G of the following decoding process (4). Since a substantial decoding process is not executed in the step 18G of the decoding process (4), the information of the obtaining 18D of the number of transfer packets (6) on the total five packets P6 to P8, P17, and P18 before and after the reception interruption state and the information for the decoding process (4) is stored in the TS analysis data processing unit 132 in the CPU 13 without being discarded. In the following step 18H, the DMAC timer control unit 33 of the CPU 13 executes the DMA setting (1). After that, the process shifts from the process responding to the latter occurrence 18E of the DMA transfer completion interruption (3) having high priority to the process responding to the former occurrence 18C of the timer interruption (7) having low priority.

In such a manner, the program returns to the process in step 18I of the decoding process (4) responding to the occurrence 18C of the timer interruption (7) having low priority. As described above, the information of the decoding process (4) on total five packets P6 to P8, P17, and P18 due to the obtaining 18D of the number of transfer packets (6) responding to the former occurrence 18C of the timer interruption (7) having low priority is stored in the TS analysis data processing unit 132 in the CPU 13. Therefore, the decoding process (4) in step 18I is restarted, and the decoding process on the five packets P6 to P8, P17, and P18 is executed. In step 18J, the DMAC timer control unit 133 in the CPU 13 executes the timer setting (5).

Figure 13:
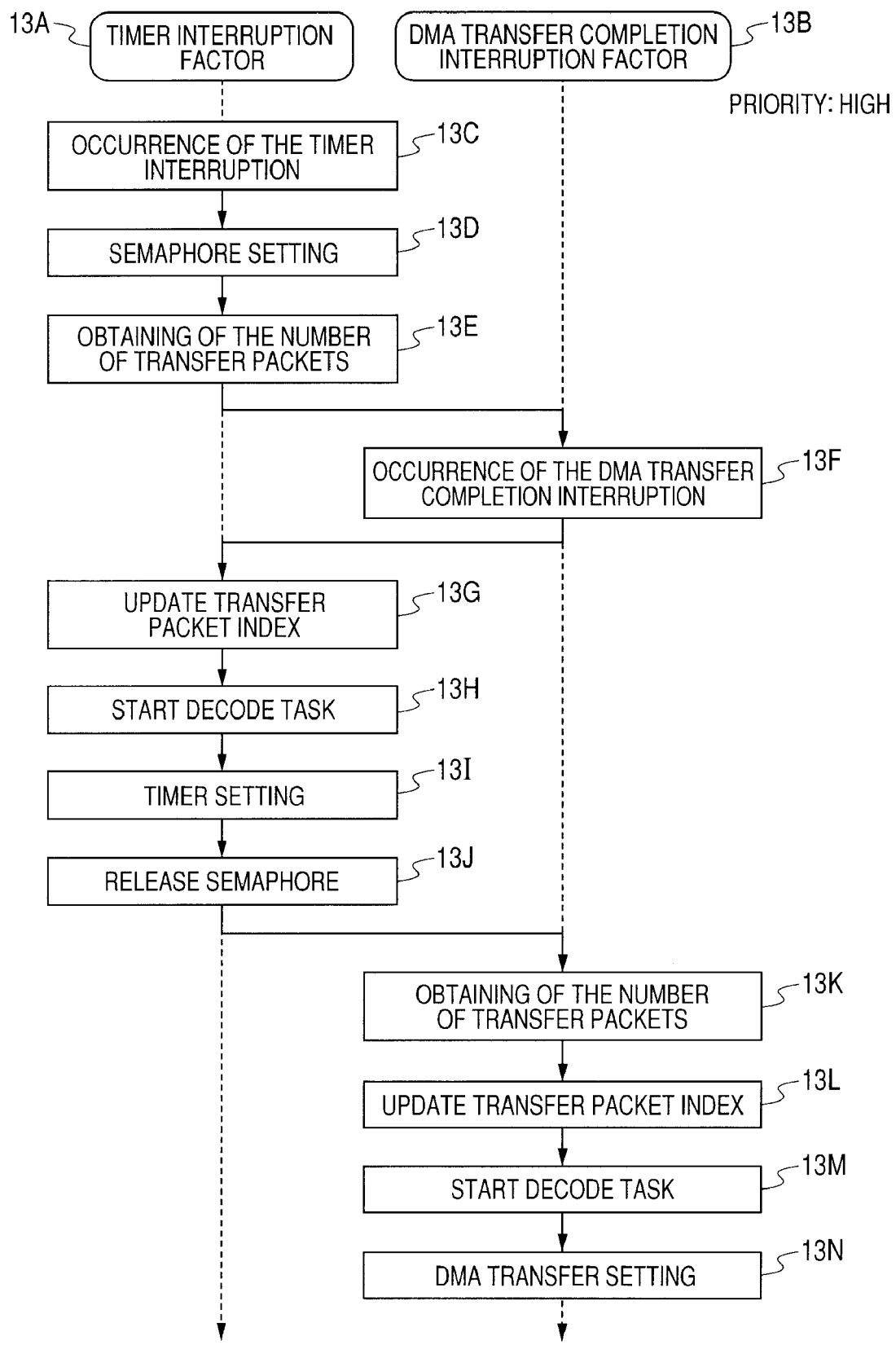
FIG. 13 is a diagram illustrating processes examined by the inventors herein prior to the present invention in order to solve the problem of the overlapping process in the process for the plurality of interruption factors shown in FIGS. 12A and 12B.

In such a manner, according to the first embodiment of the invention shown in FIGS. 14 to 18, it is unnecessary to employ the semaphore control requiring long process time as shown in FIG. 13, so that the load of the process performed on a plurality of interruption factors can be lessened.

Although the present invention achieved by the inventors herein has been concretely described on the basis of the various embodiments, obviously, the invention is not limited to the above but may be variously changed without departing from the gist.

Modifications

For example, the application processor according to the embodiment of the invention is not limited to receive the One Seg broadcasting of the terrestrial digital broadcasting but can be widely applied to reception of Bluetooth wave, reception of electric wave of a wireless LAN, and the like.

Therefore, in the application processor 1 shown in FIG. 15, in place of the TSIF (Transport Stream Interface) 11 that receives the MPEG2-TS, a data I/O interface for receiving reception bit stream data based on various reception electric waves and outputting a transmission bit stream for generating transmission electric waves can be used.

In the application processor 1 shown in FIG. 15, the process executed in response to the timer interruption (7) or the DMA transfer completion interruption (3) is not limited to the decoding process (4) of decoding video and sound by the MPEG decoder 18 after the demultiplexing (DEMUX) process by the CPU 13. As other processes, various data processes performed by the CPU 13, another coprocessor, or another accelerator are expected.

Further, in the application processor 1 shown in FIG. 15, the process of generating the timer interruption (7) or the DMA transfer completion interruption (3) is not limited to the DMA transfer by the DMAC 12. For example, as other processes, various data processes performed by the CPU 13, another coprocessor, or another accelerator with longer process time and heavier process burden are expected.

What is claimed is:

1. A semiconductor integrated circuit comprising a reception interface, a memory interface, a data transfer unit, and a process unit,
wherein the reception interface includes a buffer capable of sequentially storing a plurality of pieces of reception packet data, and a timer performing counting operation,
wherein the memory interface can be coupled to an external memory,
wherein the data transfer unit can transfer the pieces of reception packet data stored in the buffer to the external memory coupled to the memory interface,
wherein the process unit can process the pieces of reception packet data transferred and stored to the external memory,
wherein when the data transfer unit completes transfer of the pieces of reception packet data of predetermined number of packets from the buffer to the external memory, the data transfer unit can notify the process unit of a data transfer completion interruption,
wherein in response to occurrence of the data transfer completion interruption from the data transfer unit, the process unit can start processing the pieces of reception packet data stored in the external memory,
wherein during interruption of reception of the pieces of reception packet data to the reception interface, the timer executes the counting operation,
wherein in the case where the data transfer of the pieces of reception packet data of the predetermined number of packets is not completed within predetermined count time by the counting operation during the reception interruption, the timer can notify the process unit of a timer interruption,
wherein in response to occurrence of the timer interruption from the timer, the process unit can start processing reception packet data stored in the external memory prior to the reception interruption,
wherein the reception interface further includes a packet counter that stores the number of transfer packets of the reception packet data transferred to the external memory by the data transfer unit,
wherein before the process unit starts processing the pieces of reception packet data stored in the external memory in response to occurrence of the data transfer completion interruption, the process unit can obtain the number of transfer packets from the packet counter,
wherein in response to occurrence of the timer interruption, before the process unit starts processing the reception packet data stored in the external memory before the reception interruption, the process unit can obtain the number of transfer packets from the packet counter,
wherein after obtaining the number of transfer packets from the packet counter by the process unit, the value of the packet counter is reset to zero,
wherein after restart of reception after the reception interruption, the packet counter stores the number of transfer restart packets which are restarted to be transferred to the external memory by the data transfer unit,
wherein the process unit obtains the number of transfer packets of the reception packet data stored in the external memory before the reception interruption from the packet counter in response to the occurrence of the timer interruption, after that, the data transfer completion interruption is generated, and
wherein according to the number of transfer packets obtained from the packet counter by the process unit in response to the occurrence of the timer interruption, either the process responding to the occurrence of the timer interruption of the reception packet data stored in the external memory or the process responding to the occurrence of the data transfer completion interruption of the pieces of reception packet data stored in the external memory is omitted.

2. The semiconductor integrated circuit according to claim 1,
wherein in the case where the number of transfer packets obtained from the packet counter by the process unit in response to the occurrence of the timer interruption is smaller than the predetermined number of packets, execution of the process responding to the occurrence of the timer interruption of the reception packet data stored in the external memory before the reception interruption is omitted, and the process responding to the occurrence of the data transfer completion interruption of the pieces of reception packet data stored in the external memory is executed, and
wherein in the case where the number of transfer packets obtained from the packet counter by the process unit in response to the occurrence of the timer interruption is equal to the predetermined number of packets, the process responding to the occurrence of the timer interruption of the reception packet data stored in the external memory before the reception interruption and after the reception restart is executed and, on the other hand, execution of the process responding to the occurrence of the data transfer completion interruption of the pieces of reception packet data stored in the external memory is omitted.

3. The semiconductor integrated circuit according to claim 2, wherein the process unit includes a central processing unit, and the data transfer unit is a direct memory access controller.

4. The semiconductor integrated circuit according to claim 3, wherein the reception interface can receive a plurality of pieces of reception packet data as a form of a transport stream of MPEG.

5. The semiconductor integrated circuit according to claim 4, wherein the central processing unit of the process unit demultiplexes the pieces of reception packet data stored in the external memory in the form of the transport stream of MPEG to video and sound elementary streams by a demultiplexing process.

6. The semiconductor integrated circuit according to claim 5,
wherein the process unit further comprises an MPEG decoder, a display control apparatus, and a sound output control unit,
wherein the video and sound elementary streams separated by the central processing unit are decoded by the MPEG decoder to a video reproduction signal and a sound reproduction signal,
wherein output synchronization of the video reproduction signals is executed by the display control apparatus, and
wherein output synchronization of the sound reproduction signals is executed by the sound output control unit.

7. The semiconductor integrated circuit according to claim 1, wherein priority of the data transfer completion interruption is set to be higher than that of the timer interruption.

8. The semiconductor integrated circuit according to claim 2, wherein priority of the data transfer completion interruption is set to be higher than that of the timer interruption.

9. The semiconductor integrated circuit according to claim 3, wherein priority of the data transfer completion interruption is set to be higher than that of the timer interruption.

10. The semiconductor integrated circuit according to claim 4, wherein priority of the data transfer completion interruption is set to be higher than that of the timer interruption.

11. The semiconductor integrated circuit according to claim 5, wherein priority of the data transfer completion interruption is set to be higher than that of the timer interruption.

12. The semiconductor integrated circuit according to claim 6, wherein priority of the data transfer completion interruption is set to be higher than that of the timer interruption.

13. A semiconductor integrated circuit comprising an input interface, a first process unit, and a second process unit,
wherein the input interface includes a buffer capable of sequentially storing a plurality of pieces of input packet data, and a timer performing counting operation,
wherein the first process unit can process the pieces of input packet data stored in the buffer,
wherein the second process unit can process a process result of the first process unit,
wherein when the first process unit reads the pieces of input packet data of predetermined number of packets from the buffer and completes a first process on the read data, the first process unit can notify the second process unit of a first process completion interruption, the second process unit can start a second process on the process result of the first process unit in response to occurrence of the first process completion interruption from the first process unit,
wherein during input interruption of the pieces of input packet data to the input interface, the timer executes the counting operation,
wherein in the case where the first process on the pieces of input packet data of the predetermined number of packets is not completed within predetermined count time by the counting operation during the input interruption, the timer can notify the second process unit of a timer interruption,
wherein in response to occurrence of the timer interruption from the timer, the second process unit can start the second process on the data processed by the first process unit before the input interruption,
wherein the input interface further includes a packet counter that stores the number of packets of the data processed by the first process unit,
wherein before the second process unit starts the second process in response to the occurrence of the first process completion interruption, the second process unit can obtain the number of processed packets from the packet counter,
wherein in response to the occurrence of the timer interruption, the second process unit can obtain the number of packets of the data processed by the first process unit before the input interruption from the packet counter,
wherein after obtaining the number of transfer packets from the packet counter by the second process unit, the value of the packet counter is reset to zero,
wherein after input restart subsequent to the input interruption, the packet counter stores the number of input restart packets of restart input packet data which is restarted to be input,
wherein in response to the occurrence of the timer interruption, the second process unit obtains the number of packets of the input packet data which is input before the input interruption from the packet counter, after that, the occurrence of the first process completion interruption occurs, and wherein according to the number of processed packets obtained from the packet counter by the second process unit in response to the occurrence of the timer interruption, execution of either a process responding to the occurrence of the timer interruption by the second process unit on the data processed by the first process unit, or the second process responding to the occurrence of the first process completion interruption by the second process unit on the data processed by the first process unit is omitted.

14. The semiconductor integrated circuit according to claim 13, wherein in the case where the number of processed packets obtained from the packet counter by the second process unit in response to the occurrence of the timer interruption is smaller than the predetermined number of packets, execution of the process responding to the occurrence of the timer interruption by the second process unit on the data processed by the first process unit before the input interruption is omitted and, on the other hand, the second process responding to the occurrence of the first process completion interruption by the second process unit on the data processed by the first process unit is executed, and wherein in the case where the number of processed packets obtained from the packet counter by the second process unit in response to the occurrence of the timer interruption is equal to the predetermined number of packets, the process responding to the occurrence of the timer interruption by the second process unit on the data processed by the first process unit before the input interruption or after the input restart is omitted and, on the other hand, execution of the second process responding to the occurrence of the first process completion interruption by the second process unit on the data processed by the first process unit is omitted.

15. The semiconductor integrated circuit according to claim 14, wherein the second process unit includes a central processing unit, and the first process unit includes another process unit.

16. The semiconductor integrated circuit according to claim 13, wherein priority of the first process completion interruption is set to be higher than that of the timer interruption.

17. The semiconductor integrated circuit according to claim 14, wherein priority of the first process completion interruption is set to be higher than that of the timer interruption.

18. The semiconductor integrated circuit according to claim 15, wherein priority of the first process completion interruption is set to be higher than that of the timer interruption.

* * * * *